United States Patent
Apelbaum et al.

(10) Patent No.: US 7,493,512 B2
(45) Date of Patent: Feb. 17, 2009

(54) SYSTEM AND METHOD FOR PROVIDING DATA SERVICES VIA A NETWORK

(75) Inventors: Jacob Apelbaum, Sayville, NY (US); Elizabeth Denlea, Wading River, NY (US)

(73) Assignee: First Data Corporation, Greenwood Village, CO (US)

( * ) Notice: Subject to any disclaimer, the term of this patent is extended or adjusted under 35 U.S.C. 154(b) by 525 days.

(21) Appl. No.: 11/243,169

(22) Filed: Oct. 4, 2005

(65) Prior Publication Data

US 2007/0075747 A1    Apr. 5, 2007

(51) Int. Cl.
*G06F 11/00* (2006.01)

(52) U.S. Cl. ............................. 714/2; 714/15
(58) Field of Classification Search ............ 714/2, 714/4, 15, 16, 20; 709/231, 319
See application file for complete search history.

(56) References Cited

U.S. PATENT DOCUMENTS

| | | | |
|---|---|---|---|
| 4,590,554 A * | 5/1986 | Glazer et al. .................. | 714/13 |
| 5,271,013 A * | 12/1993 | Gleeson ....................... | 714/10 |
| 5,621,885 A * | 4/1997 | Del Vigna, Jr. ................ | 714/13 |
| 5,794,252 A * | 8/1998 | Bailey et al. ................. | 707/202 |
| 5,968,185 A * | 10/1999 | Bressoud et al. .............. | 714/10 |
| 6,216,173 B1 | 4/2001 | Jones et al. | |
| 6,823,346 B2 | 11/2004 | MacLellan et al. | |
| 6,954,877 B2 * | 10/2005 | Earl et al. .................... | 714/13 |
| 2002/0082914 A1 | 6/2002 | Beyda et al. | |
| 2002/0091753 A1 | 7/2002 | Reddy et al. | |
| 2004/0044718 A1 | 3/2004 | Ferstl et al. | |
| 2005/0080844 A1 | 4/2005 | Dathathraya et al. | |

OTHER PUBLICATIONS

International Search Report and Written Opinion for PCT/US06/37929 dated May 1, 2007.
Disclosure Under 37 C.F.R. § 1.56 dated Sep. 23, 2008.

* cited by examiner

*Primary Examiner*—Dieu-Minh Le
(74) *Attorney, Agent, or Firm*—Sutherland Asbill & Brennan LLP

(57) ABSTRACT

A method and system are provided for performing an activity. Accordingly, an activity to be performed is determined, a stored hierarchy is examined indicating a first alternate component for performing the activity first and a second alternate component for performing the activity if the first alternate component fails. The first alternate component is invoked to perform the activity, and when a failure of the first alternate component to perform the activity is detected, the second alternate component is invoked to perform the activity. A revised hierarchy is stored indicating that the second alternate component is to be invoked to perform the activity before the first alternate component is invoked to perform the activity.

20 Claims, 17 Drawing Sheets

500

132

```
Downloads Directory

Report – Lotus Notes
Report – Microsoft Access
Report – French
Report – German
Report – Japanese
```

Fig. 14

SYSTEM AND METHOD FOR PROVIDING DATA SERVICES VIA A NETWORK

FIELD OF THE INVENTION

The invention relates to communication networks, and more particularly to a system and method for enabling a user of a computer network to receive, transfer, and or store data within the network, and receive data processing services via the network.

BACKGROUND OF THE INVENTION

A number of system architectures exist to provide information and services to users over a communications network. For example, a multi-user HyperText Markup Language ("HTML") web page can allow large numbers of users to access information placed on the web page. Many multi-user web pages also facilitate the provision of services such as displaying advertisements for merchants, allowing consumers to complete purchase transactions, etc. If the web page is employed by users as a portal to access personal financial information, such as account information, each user may be required to log on by providing a username and password. The user may then receive his/her account information. Some multi-user web pages also allow a user to create a personal profile page. The user may provide personal preferences and other information, and the profile page is maintained based on the personal information provided.

Other architectures are available for providing information and services to users. For example, a personal HTML web page allows the owner of the web page to post personal information, photos, diary entries, etc. If the personal web page is maintained on a network, such as the Internet, other users on the network may view the web page by entering the web page's URL on a network browser. In another example, a File Transfer Protocol ("FTP") site typically comprises a static directory structure. Files may be stored in or retrieved from sub-directories in the directory structure.

However, existing systems such as those described above do not provide advanced data processing or data management capabilities to users. In addition, existing systems do not offer to a user a dedicated block of storage for storing and managing data for that user.

An additional challenge associated with many data management systems is error detection and error handling. Decision trees, which direct a system to follow a pre-defined set of actions in a pre-defined order in an attempt to respond to an error, are used in many systems to manage errors that may occur. This approach often fails to provide the flexibility needed in a complex data management system.

SUMMARY OF THE INVENTION

Embodiments of the invention are directed to an improved method and system for responding to errors in a data management system. In one example, a stored hierarchy indicating multiple alternate components that may be invoked to perform an activity is dynamically updated based on the measured performance of the various alternate components.

Embodiments of the invention may be used in a client management system, for example. In one example of a client management system, one or more software applications reside on a computer and the system maintains a dedicated workspace for a client which may be used to store data in one or more directories. The dedicated workspace is sometimes referred to herein as an "exchange gateway." In one example, an operator, who may be, for example, an employee of the client, may access the exchange gateway remotely, for example over the Internet. To facilitate the operator's access, the exchange gateway may also comprise a website, through which the operator can upload and download data to the directories, for example. The client management system may also receive from an operator, through the dedicated workspace, a request (referred to as an "operator request") to retrieve, transmit, store, generate and/or process specified data. When an operator request is received, the client management system analyzes the request and generates a job profile specifying one or more activities to be performed in accordance with the operator request. A job profile may also include a job schedule specifying when the one or more activities are to be performed. The client management system identifies one or more components to perform each specified activity. The components may be pre-compiled software components, for example. Subsequently, the client management system causes each specified activity to be performed in accordance with the job profile.

In this particular example, the profiling tables may comprise a list of multiple alternate components, prioritized to indicate a first alternate component to be invoked to complete the activity, a second alternate component to be invoked if the first alternate component does not succeed, etc. In accordance with an embodiment of the invention, the profiling tables may be dynamically updated, based on the measured performance of the various alternate components, to improve future performance.

Accordingly, in accordance with one embodiment of the invention, a method is provided for performing an activity, comprising determining an activity to be performed, and examining a stored hierarchy indicating a first alternate component for performing the activity first and a second alternate component for performing the activity if the first alternate component fails. The method further comprises invoking, by at least one processor, the first alternate component to perform the activity, and invoking, by the at least one processor, the second alternate component to perform the activity, when a failure of the first alternate component to perform the activity is detected. A revised hierarchy indicating that the second alternate component is to be invoked to perform the activity before the first alternate component is invoked to perform the activity, is then stored.

The activity may comprise, for example, accessing a remote database server, retrieving data from a database, invoking a stored procedure, converting a data file from a first format to a second format, converting a data file from a first language to a second language, creating a new file, appending data to an existing file, executing operating system commands locally and remotely, loading data into a database table, archiving and compressing data, and/or invoking web services from the Internet.

The first alternate component and/or the second alternate component may comprise a pre-compiled software component.

In another embodiment, an apparatus is provided for performing an activity, comprising a means for determining an activity to be performed and a means for examining a stored hierarchy indicating a first alternate component for performing the activity first and a second alternate component for performing the activity if the first alternate component fails. A means is also provided for invoking the first alternate component to perform the activity, and a means is provided for invoking the second alternate component to perform the activity, when a failure of the first alternate component to perform the activity is detected. The apparatus further comprises a means for storing a revised hierarchy indicating that the second alternate component is to be invoked to perform the activity before the first alternate component is invoked to perform the activity.

In yet another embodiment, a system is provided for performing an activity, comprising a memory for storing a hierarchy indicating a first alternate component for performing the activity first and a second alternate component for performing the activity if the first alternate component fails. A processor is provided, programmed to determine an activity to be performed, examine the stored hierarchy, and invoke the first alternate component to perform the activity. The processor is further programmed to invoke the second alternate component to perform the activity, when a failure of the first alternate component to perform the activity is detected, and store a revised hierarchy indicating that the second alternate component is to be invoked to perform the activity before the first alternate component is invoked to perform the activity.

BRIEF DESCRIPTION OF THE DRAWINGS

Further objects, features and advantages of the invention will become apparent from the following detailed description taken in conjunction with the accompanying drawing showing an illustrative embodiment of the invention, in which:

FIG. 14 shows a GUI showing the contents of a directory in a dedicated workspace, in accordance with an embodiment of FIGS. 8A-8D.

DETAILED DESCRIPTION

Figure 1:
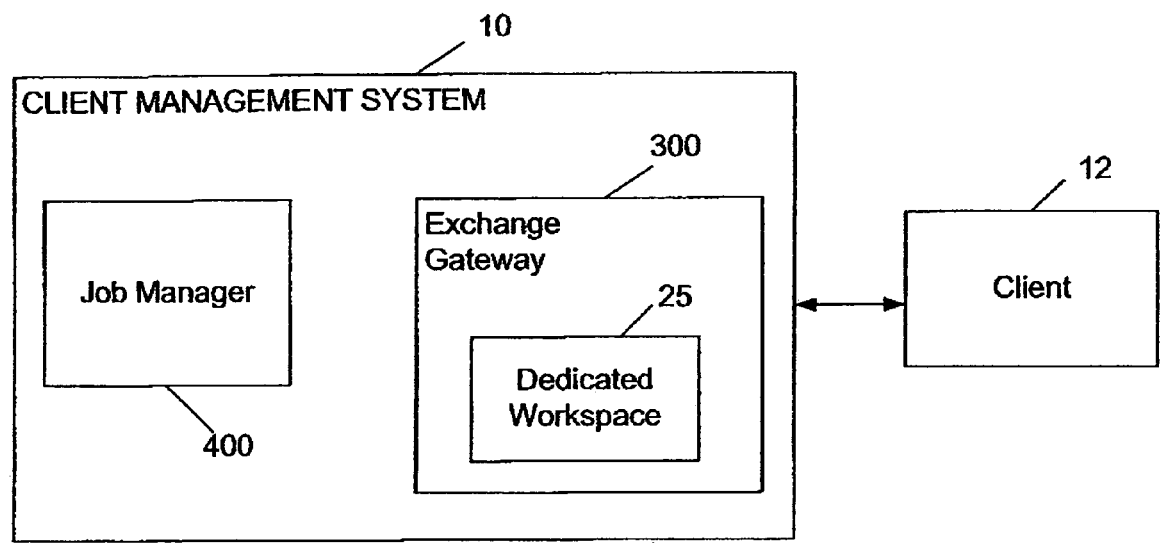
FIG. 1 shows an example of a system comprising a client management system and a hypothetical client, in accordance with an embodiment of the invention.

Embodiments of the invention are directed to an improved method and system for responding to errors in a data management system. A stored hierarchy indicating multiple alternate components that may be invoked to perform an activity is dynamically updated based on the measured performance of the various alternate components.

In accordance with one embodiment of the invention, a client management system, which may comprise one or more software applications residing on a computer, receives from an operator a request (referred to as an "operator request") to retrieve, transmit, store, generate and/or process specified data. When an operator request is received, the client management system analyzes the request and generates a job profile specifying one or more activities to be performed in accordance with the operator request. The one or more activities may include, for example, accessing a remote database server, retrieving data from a database, invoking a stored procedure, converting data from a first format to a second format, etc. A job profile, which may include one or more profiling tables, may also include a job schedule specifying when the one or more activities are to be performed. The client management system identifies one or more components to perform each specified activity. The components may be pre-compiled software components, for example. Subsequently, the client management system causes each specified activity to be performed in accordance with the job profile.

In accordance with another embodiment of the invention, the profiling tables may comprise a list of multiple alternate components, prioritized to indicate a first alternate component to be invoked to complete the activity, a second alternate component to be invoked if the first alternate component does not succeed, etc. The profiling tables may be dynamically updated, based on the measured performance of the various alternate components, to improve future performance.

The client management system 10 may be used for a variety of purposes. In one example, the client management system 10 is used internally within an organization, for example, by various departments within a corporation. Alternatively, the client management system 10 may be maintained to offer services to multiple, third party clients separate from the organization responsible for maintaining the client management system 10.

It should be noted that the terms "client" and "operator" are used herein to refer to different parties. A client is typically an organization, for example, a corporation that uses the services provided by the client management system. The client organization may be separate from that which manages the client management system. Alternatively, a client may a department within the organization that manages the client management system. Integral to the services provided by the client management system is the ability of the client to submit job requests to the client management system. The term "operator" refers to an individual (or individuals) who accesses the client management system over a communication link and provides to the client management system information pertaining to such a job request, to enable the client management system to generate a job profile in accordance with the job request. An operator may be any one of a variety of parties. For example, the operator may be an employee of a client. In such a case, the operator may access the client management system, for example, through a client website associated with the dedicated workspace (exchange gateway). Alternatively, the operator may be a system administrator within the organization responsible for maintaining and operating the client management system. In such case, a client may describe a job request in writing, such as in an email message submitted via the exchange gateway, and the system administrator may review the email message and, in response, access the client management system to input the pertinent information.

FIG. 1 illustrates an example of a system comprising a client management system 10 and a hypothetical client 12, in accordance with an embodiment of the invention. The client management system 10 may reside and operate on one or more computers, for example. The client management system 10 comprises an exchange gateway 300 and a job manager 400. The exchange gateway 300 maintains a dedicated workspace 25 for the benefit of the client 12. The dedicated workspace 25 may comprise one or more predetermined storage locations accessible only to the client 12. In the example shown in FIG. 1, the dedicated workspace 25 comprises one or more dedicated storage directories accessible only to the client 12. The dedicated workspace 25 may also include a client website for the client through which the client 12 may access the dedicated directories. For example, the client 12 may utilize the client website to download, upload, and store data files in the dedicated workspace 25. The exchange gateway 300 may also configure the client website in accordance with the client branding strategy.

A client 12 may utilize the dedicated workspace 25 to submit requests to the client management system 10. An operator, who may be, for example, an employee of the client, may submit an operator request through the client website, for example. In accordance with an embodiment of the invention, the client management system 10, in response to an operator request, uses information provided in the request to define a "job" in accordance with the operator request. A job may include one or more activities such as, for example, accessing a remote database server located on the client's premises; retrieving data from a database; invoking a stored procedure; converting a data file from a first format to a second format; converting a data file from a first language to a second language; creating a new file; appending data to an existing file; executing operating system commands locally and remotely; loading data into a database table; archiving and compressing data; invoking web services from the Internet, etc. The client management system 10 subsequently causes the job to be performed.

The client management system 10 comprises a library of pre-compiled software components capable of performing a wide variety of activities. When a dedicated workspace is established for a particular client, the client specifies which types of job requests are to be submitted through the workspace. The system administrator may verify that the client management system 10 comprises components necessary for achieving the specified job requests. If additional components are required to enable the performance of a particular job, they may be created for that purpose.

Figure 2:
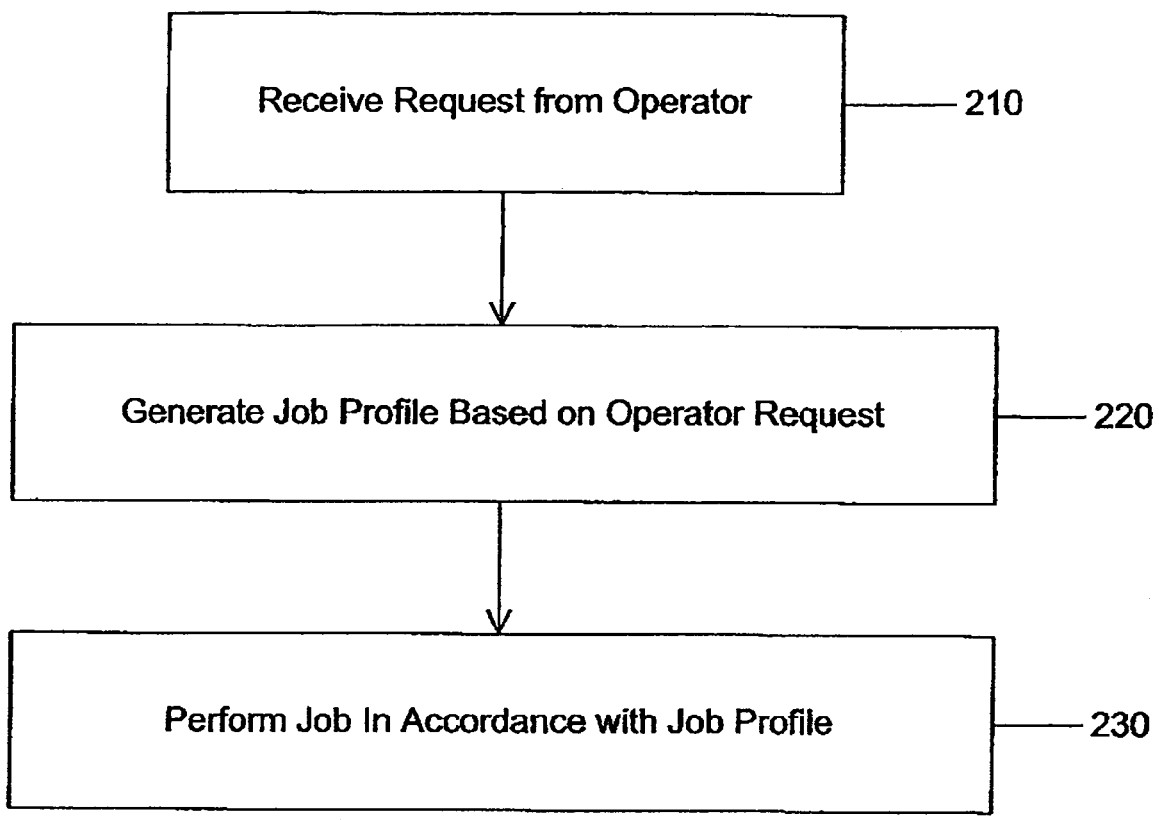
FIG. 2 is an example of a method for generating and performing a job based on an operator request, in accordance with an embodiment of the invention.

FIG. 2 is an example of a method for generating and performing a job based on an operator request, in accordance with an embodiment of the invention. At step 210, the client management system 10 receives a request from an operator. In this example, let us suppose that the operator is an employee of a client, which is a large corporation utilizing the services of the client management system 10. Suppose that the operator requests that a financial report be generated and provided to the client on a regular basis. The operator further specifies that the report be generated based on selected financial data stored on a specified data server located on the client's premises. The operator additionally requests that several versions of the report be created—such as versions in several different commercial database formats, and versions in several different languages—and that the various versions of the report be encrypted, compressed, and deposited in a specified directory in the client's dedicated workspace. Finally, a specified employee of the client should be notified by email each time the report is generated.

At step 220, the client management system 10 generates a job profile based on information in the operator request. The client management system 10 analyzes the operator request and identifies one or more activities required to satisfy the operator request. For example, in the scenario discussed above, the client management system 10 may identify the following activities, among others: (1) access the specified database server; (2) retrieve the raw financial data; (3) generate the report based on the data; (4) convert the report into various database formats; (5) convert the report into various languages, etc.

The client management system 10 additionally identifies one or more components to perform each identified activity. The client management system 10 comprises a library of components capable of performing a wide variety of activities. The library may include pre-compiled software components, for example. The use of pre-compiled software components is known in the art. In some cases, the operator may provide additional input to facilitate the identification of various activities and the corresponding components.

The client management system 10 generates a job profile comprising data identifying the one or more activities and the corresponding components. The job profile may also comprise a performance schedule specifying a time or times when each activity is to be performed. The data in the job profile may be stored, for example, in one or more profiling tables stored within the client management system 10.

At step 230, the job manager 400 causes the job to be performed in accordance with the job profile. To perform a respective activity associated with the job, the job manager 400 examines one or more profiling tables, determines from a job schedule that the activity is scheduled to be performed at a specified time, assembles the components assigned to perform the activity, and directs the components to perform the activity in accordance with the schedule.

Figure 3:
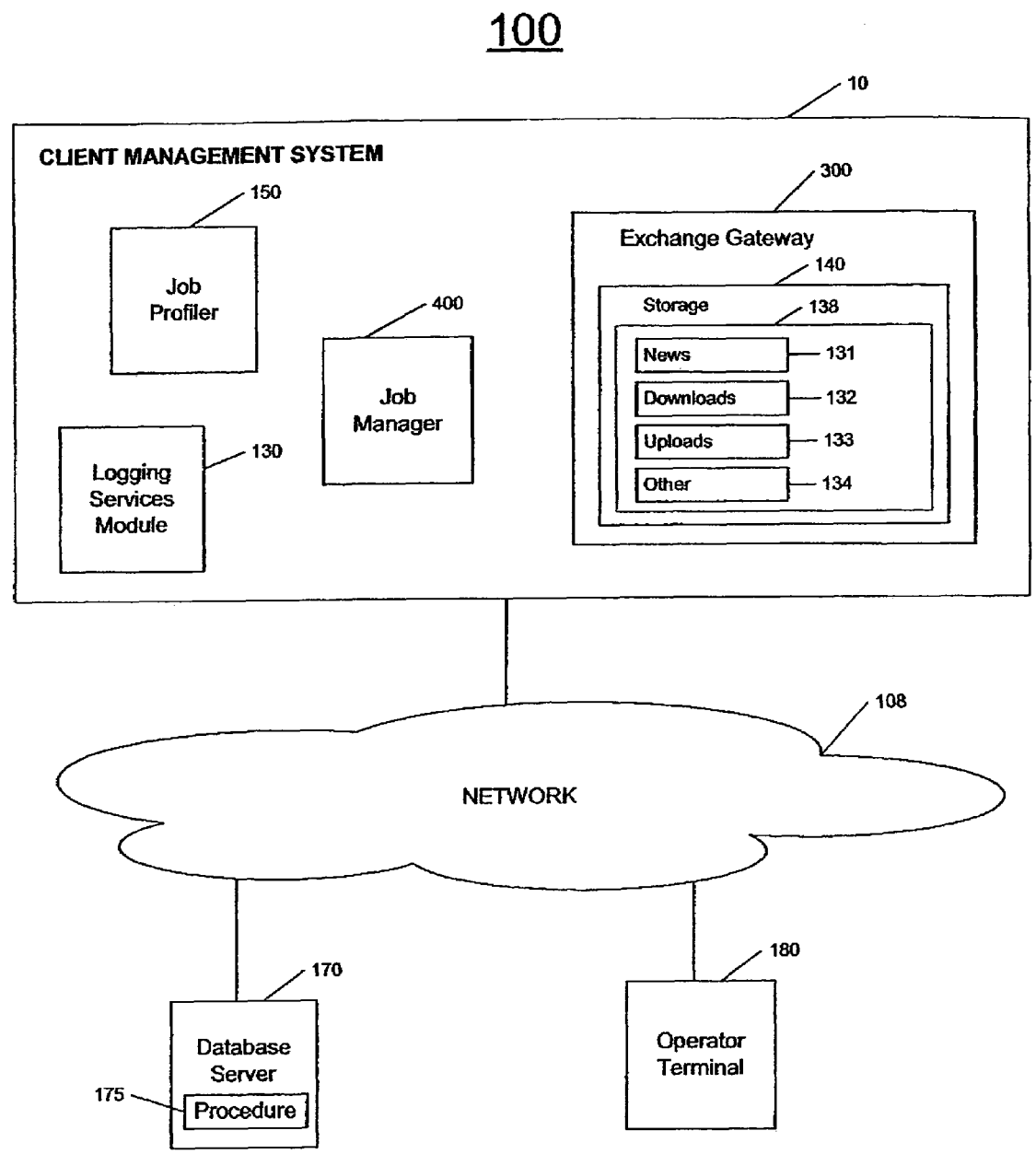
FIG. 3 shows an example of a communication system, in accordance with the embodiment of FIG. 1.

FIG. 3 illustrates an example of a communication system 100 within which the client management system 10 may operate, in accordance with the embodiment of FIG. 1. System 100 comprises client management system 10, network 108, operator terminal 180, and database server 170. Client management system 10 comprises job profiler 150, job manager 400, exchange gateway 300, and logging services module 130, each of which may be a software application residing on one or more computers. Storage 140 may comprise any storage device or software application capable of storing data. For example, storage 140 may include one or more disk drives.

The network 108 may comprise an intranet, a local area network ("LAN"), a wide area network ("WAN"), an Internet, Fibre Channel-based storage area network ("SAN") or Ethernet, for example. Alternatively, the network 108 may include a combination of different types of networks.

The database server 170 is connected over network 108 to client management system 10. Database server 170 may be any device or software application capable of storing data. For example, the database server 170 may be a software application executing on a computer such as a desktop PC.

The operator terminal 180 is also connected over network 108 to client management system 10. The operator terminal 180 may be any device capable of communicating with client management system 10 over network 108, such as a computer, personal digital assistance ("PDA"), cellphone, telephone, etc.

A. Exchange Gateway

As discussed above, the exchange gateway 300 may maintain one or more dedicated client workspaces. A dedicated workspace may be maintained in storage, such as storage 140, and may comprise one or more physical directories for storing files, for example. A dedicated workspace may also include a client website. The exchange gateway 300 may receive requests from an operator through the dedicated workspace.

By way of example, suppose that a client, the XYZ Company, requests that a dedicated workspace be created for the XYZ Company. Referring to FIG. 3, the exchange gateway 300 constructs a dedicated workspace 138 for the XYZ Company comprising multiple directories within in storage 140. The dedicated workspace 138 may also comprise one or more predetermined storage locations. In the illustrative example shown in FIG. 3, the XYZ Company dedicated workspace 138 comprises four directories: News 131, Downloads 132, Uploads 133, and Other 134. The exchange gateway 300 also creates a client website through which the client may access the directories.

The directories in the dedicated workspace 138 are accessible only by the client (and by the system administrator). A client name and password may be created for the persons associated with the client to employ when accessing the workspace through the client website. For example, the username "XYZ" and password "12345678" may be selected for the XYZ Company dedicated workspace. In addition, access rights and privileges may be established with respect to each individual directory in the dedicated workspace 138. Industry standard access control lists ("ACLs") may be used to establish access rights.

If desired by the client, multiple access levels may be established for a respective directory. For example, a first individual or group of individuals may be granted read-write privileges to files within a selected directory, while a second individual or group may be granted read-only privileges with respect to the files within the directory.

In an embodiment of the invention, an operator working at operator terminal 180 accesses the dedicated workspace 138 by inputting an URL associated with the exchange gateway 300 into the address field of a standard Internet browser. In a well-known manner, the entry of the URL into the browser causes a communication link to be established between the operator terminal 180 and the exchange gateway 300, via the network 108.

In the embodiment illustrated in FIG. 3, the exchange gateway 300 may be a TCP/IP based web server. The exchange gateway 300 receives data from a variety of input sources. For example, the exchange gateway 300 may from time to time receive data from the client (through the client website, for example) with a request that the data be uploaded to the client's dedicated workspace 138. In addition to receiving data from the client, the exchange gateway 300 may receive data from a variety of other input sources, including job manager 400. For example, the job manager 400 may transmit to the exchange gateway 300 a request to store selected data in a specified directory within the client's dedicated workspace 138, in accordance with the performance of a job. Instructions, requests, and data may be received from the job manager 400 in the form of message queues, XML spreadsheet text, or as database, binary, or formatted RTF files, for example. Instructions and requests may also be received from the job manager 400 in Simple Object Access Protocol ("SOAP") format. The exchange gateway 300 may also receive data, job requests, HTTP requests, queries, etc., from external sources via file uploads, or in SOAP format.

The exchange gateway 300 may provide data to one or more output sources. In response to an operator request to upload a file, the exchange gateway 300 may utilize a software application, such as Web-based Distributed Authoring and Versioning ("WebDAV"), to upload the file to the appropriate client's dedicated workspace 138. WebDAV is a well-known internationally agreed-upon standard protocol comprising a set of extensions to the HTTP protocol which allow programmers to collaboratively edit and manage files on remote web servers. The client may additionally download data files from the dedicated workspace 138. Data file downloads may be performed using HTTP, for example. The exchange gateway 300 may also provide requests and other data to the job manager 400. In addition, the exchange gateway 300 may transmit data to a specified destination over the Internet. Such output may be transmitted in SOAP format, for example, in the form of HTTP responses, etc.

Figure 4:
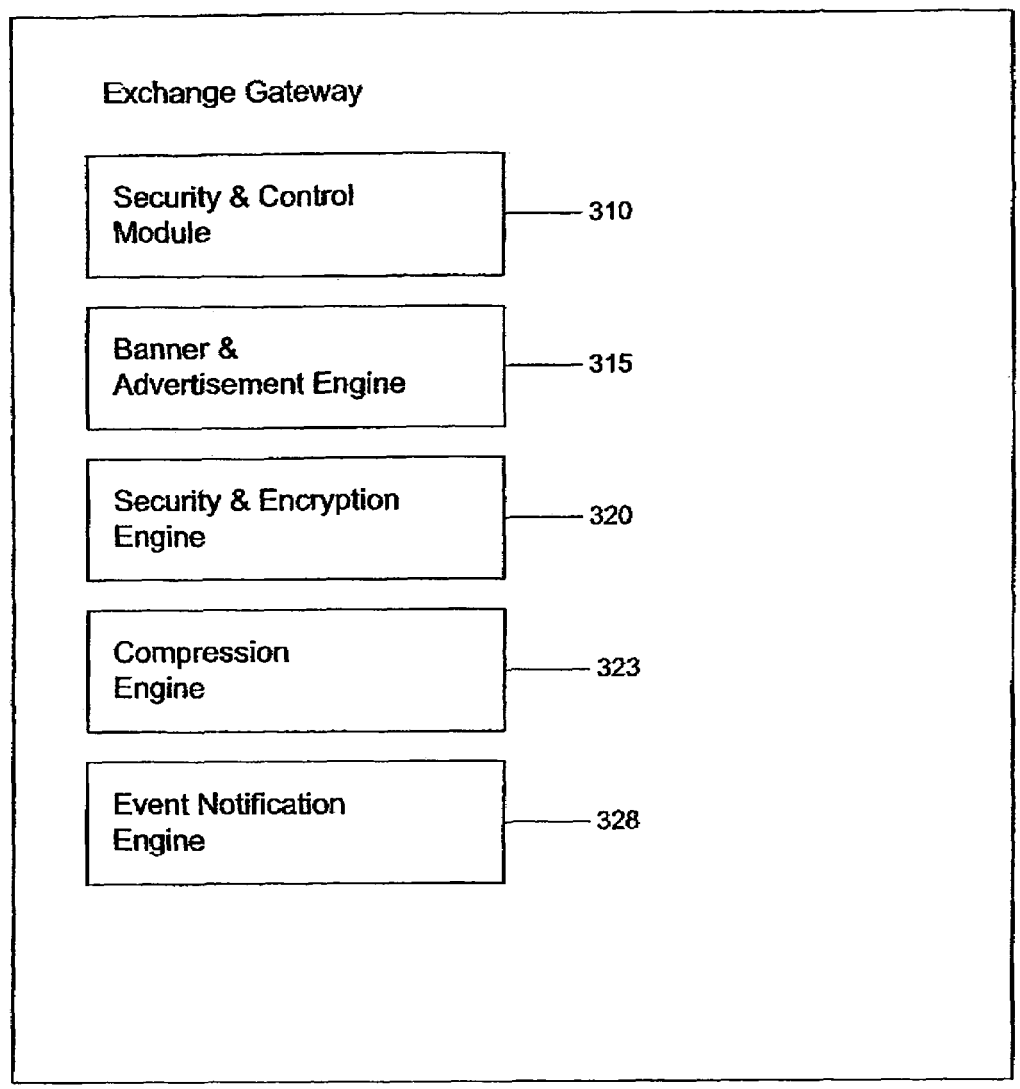
FIG. 4 shows examples of components of an exchange gateway, in accordance with the embodiment of FIG. 1.

FIG. 4 illustrates examples of components of the exchange gateway 300, in accordance with the embodiment of FIG. 1. In this example, the exchange gateway 300 comprises security & control module 310, banner & advertisement engine 315, security & encryption engine 320, compression engine 323, and event notification engine 328.

1. Security & Control Module

The security & control module 310 controls an operator's access to files and directories. For example, the security & control module 310 may enforce rights and privileges established in accordance with ACLs, Microsoft Windows NT File System ("NTFS"), Microsoft XP Encrypted File System ("EFS"), etc.

If desired by the client, the security & control module 310 may establish multiple access levels for a respective directory. For example, a first individual or group of individuals may be granted read-write privileges to files within a selected directory, while a second individual or group may be granted read-only privileges with respect to the files within the directory.

2. Banner & Advertisement Engine

The banner & advertisement engine 315 configures and maintains advertisements in a client website. The banner & advertisement engine 315 may also configure and maintain selected text and graphical content within the client website in accordance with the client's branding strategy. For example, logos and other images may be placed on selected webpages to impart a desired style or overall "look" to the website. The banner & advertisement engine 315 may also launch advertisements on the client website. For example, a marquee may shown on the website. An advertisement on the client website may be configured to appear only until a specified expiration date. In accordance with an embodiment of the invention, advertisements placed on a client website may be targeted at the clients and associated users. For example, the manager of the client management system 10 may employ advertisements to offer additional services to the client. Alternatively, the manager may sell the advertising space to a third party provider of services. In such case, if a user clicks on a selected advertisement, the user may be connected to a related website associated with the third party provider.

3. Security & Encryption Engine

The security & encryption engine 320 manages a variety of security-related functions, including, for example, authentication functions necessary to access a remote system. The security & encryption engine 320 may also receive an input data stream and encrypt the stream, producing an encrypted output stream. The security & encryption engine 320 utilizes standard, well-known encryption algorithms such as, for example, 3DES or DES. The encryption algorithm used may be determined by the requirements of the job being performed.

4. Compression Engine

The compression engine 323 receives an input data stream and compresses the stream, producing a compressed output stream. The compression engine 323 may utilize standard, well-known compression techniques such as, for example, Huffman coding. The compression engine 323 may use commercially-available software; alternatively, custom-designed algorithms may be utilized. In one example, custom-designed software based on the well-known LZ77 algorithm may be used. The use of custom-designed compression algorithms offers several advantages. Because a custom-designed compression engine may be deeply integrated into the software which controls the client management system 10 and the exchange gateway 300, it may execute more quickly and efficiently than a commercially-available product. A custom-designed compression engine may provide additional advantages as well, such as a plug-in interface allowing an administrator to select different compression algorithms based on client request, or to adapt a respective algorithm to the needs of a given job.

5. Event Notification Engine

The event notification engine 328 generates a message and transmits the message to the intended recipient via a specified medium. Automatic generation and transmission of messages is well-known in the art. For example, event notification engine 328 may, in accordance with a job schedule stored in one or more profiling tables, periodically generate an email message to a system administrator notifying him/her that a specified database has been updated as specified by the job profile. Event notification engine 328 may alternatively send messages in other forms, such as by page or facsimile.

B. Job Manager

The job manager 400 manages the creation, scheduling, and performance of jobs. The job manager 400 receives an operator request, generates a job profile based on the request, and causes the job to be performed in accordance with the job profile. In one embodiment, the job manager 400 may also receive a communication generated by another component (or by the job manager itself) requesting that a job be generated based on specified parameters. In this example, when such a communication is received, the job manager 400 automatically generates a job profile based on the request, and automatically causes the job to be performed in accordance with the job profile.

The job manager 400 may receive operator requests from a variety of sources, including, for example, an operator request generated by an operator via a client's dedicated workspace; a request generated by a component of the job manager 400 itself, or by a component of the exchange gateway 300; a request generated by a remote, third-party system; an operator request generated by a system administrator via an administrative console, etc. It should be noted that this list of sources is illustrative only, and that requests may be received from a wide variety of additional sources not listed above.

In accordance with an embodiment of the invention, the job manager 400 generates a job profile by analyzing the operator request and identifying one or more activities that are to be performed in accordance with the operator request. Activities may include, for example, accessing a remote database server located on a client's premises; retrieving data from a database; invoking a stored procedure; converting a data file from a first format to a second format; converting a data file from a first language to a second language; creating a new file; appending data to an existing file; executing operating system commands locally and remotely; loading data into a database table; archiving and compressing data; invoking web services on the intranet/Internet; etc. One or more activities may produce output data. A wide variety of actions may be performed with respect to output data. For example, output data may be placed on a network drive; stored in a database table in a remote database; sent to an FTP drop zone; passed as an argument to another process; broadcast to a wireless device; etc. Data may be provided to various output destinations including the exchange gateway 300 (using HTTPS, for example), remote destinations via the Internet (using TCPIP, SOAP, etc.), or to internal network destinations (using NetBIOS, FTP, etc.).

In accordance with an embodiment of the invention, the job manager 400 additionally identifies one or more components to perform each activity. The one or more components may be may be pre-compiled software components, for example. The job manager 400 comprises a library of pre-compiled software components capable of performing a wide variety of activities. These components are described in further detail below. The identification of components may be automatic, semi-automatic, or human-driven. For example, in some cases, the operator may provide additional input to facilitate the identification of various activities and the corresponding components.

The job manager 400 may additionally generate a job schedule according to which various activities are to be performed by selected components. Information pertaining to the activities, the components, and the job schedule, referred to collectively as the "job profile," is stored in one or more profiling tables. In one example, a set of tables containing, collectively, the job profiles for various jobs are stored in memory 461. The tables are arranged in a hierarchical fashion. A master table lists all existing jobs and a job identifier ("job ID") for each job. A second table, indexed by job ID, stores data indicating which components are assigned to each job. In addition, various tables are maintained, each corresponding to a selected component in client management system 10. A table corresponding to a particular component stores information pertaining to one or more jobs requiring action by that component, and any parameters required for the component to perform the activities required by each job. Separately, a job scheduling table comprises a schedule indicating times when various jobs and/or activities are to be performed. The job manager 400 assembles the selected components to create a job assembly and causes the job assembly to perform the corresponding job in accordance with the job profile and the job scheduling table.

Figure 5:
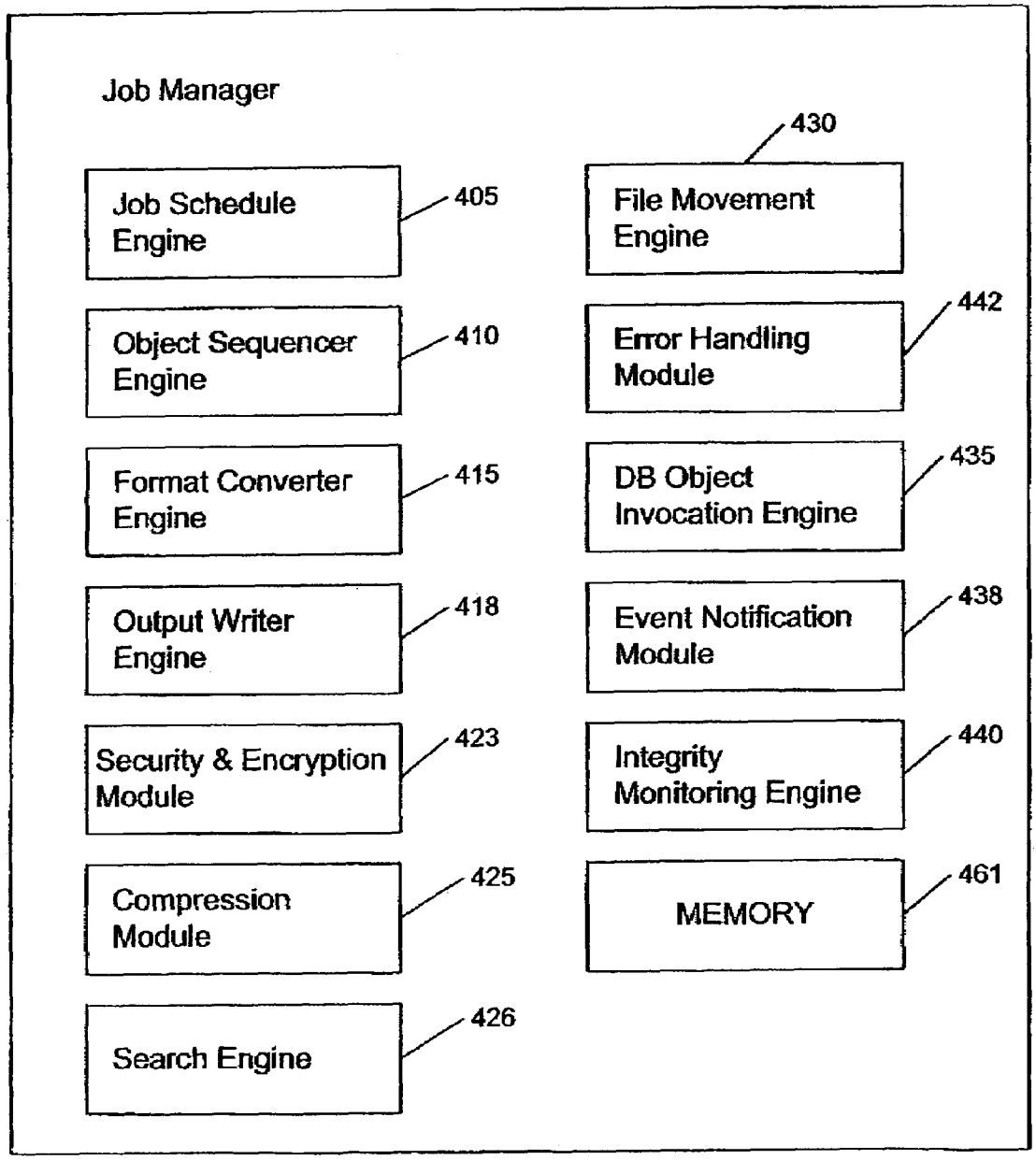
FIG. 5 shows examples of components of a job manager, in accordance with the embodiment of FIG. 1.

FIG. 5 illustrates examples of components of the job manager 400, in accordance with the embodiment of FIG. 1. The job manager 400 comprises job scheduler engine 405, object sequencer 410, format converter engine 415, output writer engine 418, security & encryption module 423, compression module 425, search engine 426, file movement engine 430, DB object invocation engine 435, event notification module 438, integrity monitoring engine 440, error handling module 442, and memory 461.

1. Job Scheduler Engine

The job scheduler engine 405, under the direction of the job manager 400, and in accordance with one or more profiling tables, causes various components specified in a job profile to execute activities. The job scheduler engine 405 regularly monitors the contents of one or more profiling tables and data received from an internal clock to determine when various activities associated with the jobs defined in such tables are to be performed. When the job scheduler engine 405 determines that a particular activity is due to be performed, the corresponding component is invoked and directed to complete the activity. Alternatively, the job scheduler engine 405 may receive time data from an external clock. In one example, the job scheduler engine 405 continually scans the job scheduling table to determine which jobs are due to be performed.

The job scheduler engine 405 may additionally receive data from other components of the job manager 400, including the object sequencer engine 410, the event notification module 438, etc. The job scheduler engine 405 may additionally generate its own input data. The job scheduler engine 405 may also receive input from external sources such as the Internet.

Data generated by the job scheduler engine 405 may be transmitted to a variety of destinations, including, for example, the object sequencer engine 410, the event notification module 438, or to an address on the Internet.

2. Object Sequencer Engine

The object sequencer engine 410 examines a job profile and generates, based on information in the job profile, an assembly, or program, to perform the job using one or more pre-existing components. The pre-existing components may comprise pre-compiled code, for example. Typically, the object sequencer engine 410 examines a job profile, identifies one or more activities defined therein and identifies one or more pre-existing components to perform each identified activity. Accordingly, an assembly may comprise multiple components corresponding to all, or some, of the activities associated with a job. Thus, the assembly may comprise a single program capable of performing multiple activities.

The object sequencer engine 410 may additionally generate a new component based on an assembly created from multiple preexisting components. For example, if an assembly is created from components A and B, which perform a first activity and a second activity, respectively, the object sequencer engine 410 may use the assembly as the basis for a new component which is capable of performing both the first and the second activities. The new component is added to the library and may be used subsequently to perform the relevant set of activities. In one example, components A and B are combined to create a new component only if the two components are used in combination by an operator more than a predetermined number of times within a predetermined time period. The creation of new components may be automatic, semi-automatic, or human driven.

The object sequencer engine 410 may also examine an operator request or a job profile, identify one or more specified activities included therein, and generate one or more algorithms for performing each specified activity if an appropriate component does not already exist in the library. An algorithm may specify alternative methods for performing a given activity depending on input conditions.

3. Format Converter Engine

The format converter engine 415 receives an input file formatted in a first format and in a well-known manner reformats the file content to generate a second file formatted in a desired second format. For example, the format converter engine 415 may convert a Visio file to a JPEG file. In other examples, the format converter engine 415 may convert a text file to an Oracle database file, an Excel spreadsheet file to an HTML web page, etc. The format converter engine 415 may alternatively convert a file containing text in a first language to an second language, such as, for example, a German-language document to an English-language document.

4. Output Writer Engine

The output writer engine 418 transmits or stores data to one or more specified memory locations. For example, the output writer engine 418 may receive data from the format converter engine 415, access a specified database, such as an Oracle database, and store the data in the proper format and location within the database. The output writer engine 418 has the capability to interface with and store data with a variety of operating systems, such as Microsoft Windows, Linux, UNIX, etc., and to access and store data in a variety of database formats, such as in Oracle database format, SQL Server format, etc.

5. Security & Encryption Module

The security & encryption module 423 manages a variety of security-related functions, including, for example, authentication functions necessary to access a remote system. The security & encryption module 423 may also receive an input data stream and encrypt the stream, producing an encrypted output stream. As discussed above with respect to the security & encryption engine 320, the security & encryption module 423 utilizes standard, well-known encryption algorithms such as, for example, 3DES or DES. The encryption algorithm used may be determined by the requirements of the job being performed.

6. Compression Module

The compression module 425 functions in a manner similar to the compression engine 323 described above. Accordingly, the compression module 425 receives an input data stream and compresses the stream, producing a compressed output stream. As discussed above with respect to the compression engine 323, the compression module 425 utilizes standard, well-known compression techniques such as, for example, Huffman coding. The compression module 425 may use commercially-available software; alternatively, custom-designed algorithms may be utilized.

7. Search Engine

The search engine 426 provides a variety of search capabilities. For example, the search engine 425 may perform a file system search or a directory search to locate a specified file. The search engine may also search within a file, or within a directory, for a specified string, for example.

8. File Movement Engine

The file movement engine 430 transfers an existing file from a current location to a specified destination address. To retrieve or transmit data files, the file movement engine 430 may utilize any one or more well-known protocols such as FTP, UNC, WebDAV, TCP/IP, NetBIOS, etc. For example, if a job profile specifies that file A is to be transmitted to a server located at a remote location, the file movement engine 430 may use the TCP/IP protocol to transmit file A via the Internet. In another example, if the job profile specifies that file A be made available on a particular website, the file movement engine 430 may utilize WebDAV to place the file on the website. The file movement engine 430 is capable of interfacing with and accessing multiple types of data sources, as indicated in FIG. 7D (described in more detail below).

9. DB Object Invocation Engine

The database ("DB") object invocation engine 435 performs database maintenance functions necessary to update and maintain the integrity of data in a specified database (a client's database, for example), as is known in the art. When properly enabled, the DB object invocation engine 435 may pierce a security firewall within a network in order to perform necessary database maintenance functions.

10. Event Notification Engine

The event notification module 438 may generate, in accordance with a job profile, a message relating to the job and transmit the message to the intended recipient via a specified medium. Messages are generated and transmitted by methods that are well-known in the art. For example, the event notification module 438 may, every day at a predetermined hour, generate an email message to a system administrator notifying him/her that a specified database has been updated as specified by the job schedule. The event notification module 438 may also send other types of messages, such as messages relating to system administration, error notification, etc. The event notification module 438 may alternatively send messages in other forms, such as by page or facsimile.

11. Integrity Monitoring Engine

The integrity monitoring engine 440 is activated when a potential error occurs, and in response to a potential error performs a predetermined set of actions. In accordance with an embodiment of the invention, the integrity monitoring engine 440 may collect metrics on the performance of various components in client management system 10 and compares current performance against historical average performance over one or more predetermined time periods to determine whether a problem occurs. The selected time period may vary depending on the nature of the activity and the associated job that gave rise to the error. For example, if a potential error occurs during an activity associated with a job that has been running daily for twelve months, historical average performance may be collected and average performance calculated over a 365-day period, for example. The integrity monitoring engine 440 analyzes current performance measures in light of the historical average information to determine whether an error has occurred.

Figure 6:
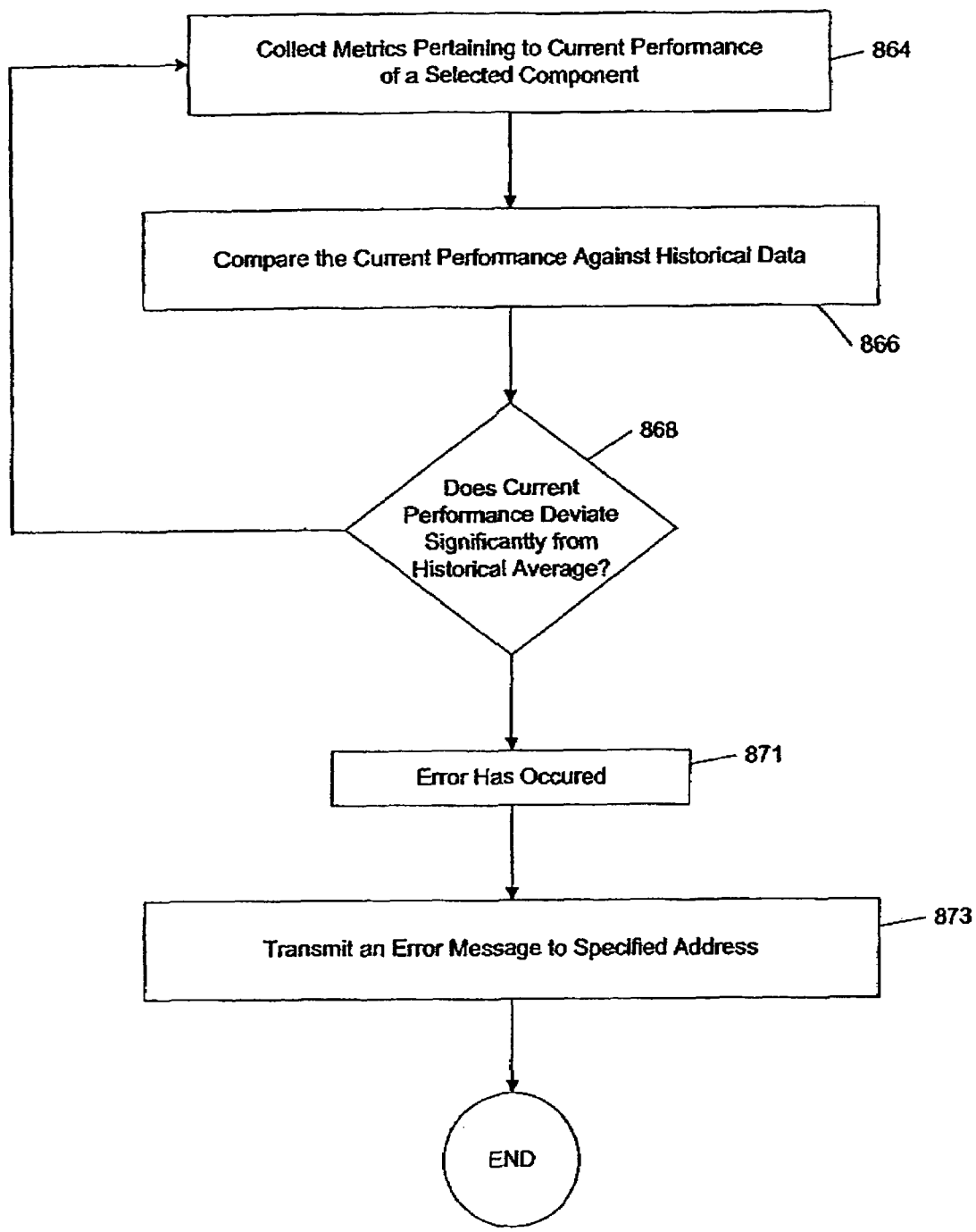
FIG. 6 is an example of a routine to detect an error, in accordance with the embodiment of FIG. 1.

FIG. 6 is an example of a routine to detect an error that may be implemented by the embodiment of FIG. 1. At step 864, the integrity monitoring engine 440 collects metrics pertaining to the performance of a selected component. For example, the integrity monitoring engine 440 may monitor how long a selected component takes to complete a particular data processing activity. At step 866, the integrity monitoring engine 440 compares the current performance against historical average performance. Referring to block 868, if the integrity monitoring engine 440 determines that the current performance does not deviate significantly from the historical data, the integrity monitoring engine 440 continues to collect performance metrics. However, if it is determined that the current performance data deviates significantly from the historical average, the integrity monitoring engine 440 concludes that an error has occurred (step 871). For example, in the example described above, the integrity monitoring engine 440 may detect that the particular data processing activity has been running for ten minutes, while on average it has required on average five minutes during the past twelve months. Accordingly, the integrity monitoring engine 440 determines that an error has occurred. At step 873, the integrity monitoring engine 440 transmits a message to a specified address, for example, to a system administrator. Alternatively, when an error occurs, the integrity monitoring engine 440 may invoke the error handling module 442 to determine an alternate solution. The error handling module 442 is described below.

As another example, if a memory buffer overflow error is detected, the integrity monitoring engine 440 may invoke event notification module 438 to transmit a message to a system administrator.

12. Error Handling Module

In accordance with an embodiment of the invention, an error handling module 442 may be invoked by another component when an error is detected to prevent a particular activity from being performed. The error handling module 442, in response to an error message received from another component or hardware element, examines a hierarchy of alternate components and actions stored in one or more associated profiling tables to determine which actions are to be taken to accomplish the activity. For example, the hierarchy may direct the error handling module 442 to invoke a different component to attempt to perform the activity using an alternate approach. The profiling tables may comprise a list of multiple alternative components, prioritized to indicate a first alternate component to be invoked to complete the activity, a second alternate component to be invoked if the first alternate component does not succeed, a third alternate component to be invoked if the second alternate component does not succeed, etc. In some instances, a single component may be specified more than once as an alternate component (for example, as a first alternate component and as a second alternate component); in such cases, the component may be called on to perform separate functions in an attempt to complete the desired activity. In addition, the profiling tables may be dynamically updated by the error handling module 442 to improve future performance.

Figure 7:
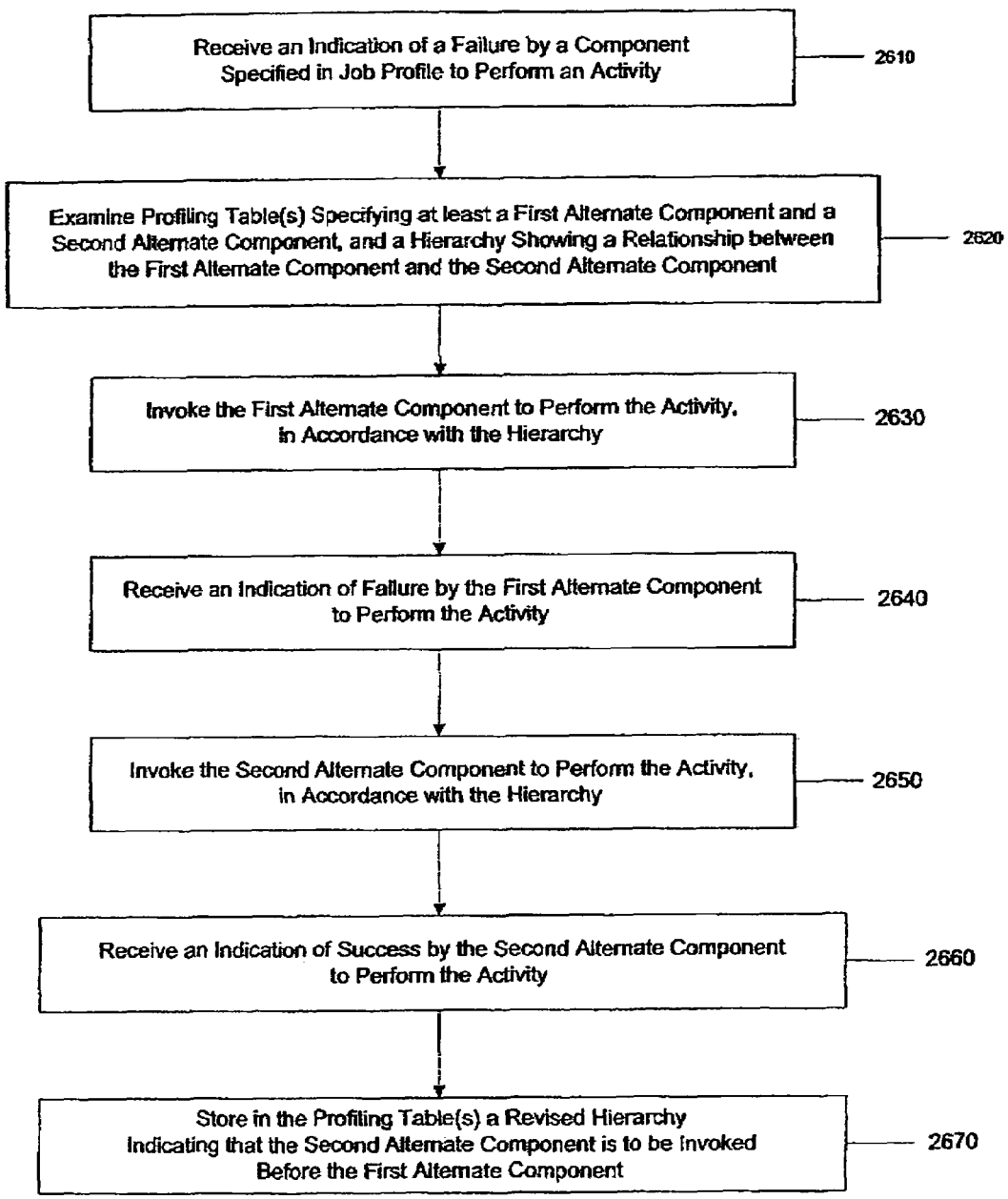
FIG. 7 is an example of a routine to select an alternate component to perform an activity, in accordance with an embodiment of the invention.

FIG. 7 is an example of a routine to select an alternate component to complete an activity, in accordance with an embodiment of the invention. In this example, let us suppose that during the performance of a particular job, the event notification module 438 is required to send a message to a specified party. Suppose further that, in accordance with the profiling tables, the event notification engine 438 sends an email message to the party's email address, but receives an error message in return indicating that the message is undeliverable to that address. Accordingly, the event notification engine 438 notifies the error handling module 442 that the attempt to deliver the email message to the specified address was unsuccessful.

At step 2610, the error handling module 442 receives an indication of the failure of a component specified in the job profile to perform a specified activity. In this example, the error handling module 442 receives an indication from the event notification engine 438 that its attempt to send the email message was unsuccessful.

In response to the communication, the error handling module 442 examines one or more profiling tables to determine one or more alternate approaches for delivering the message to the intended recipient. More specifically, the error handling module 442, at step 2620, may examine one or more profiling tables associated with the job, which specify at least a first alternate component and a second alternate component, and a hierarchy showing a relationship between the first alternate component and the second alternate component. At step 2630, the error handling module 442 invokes the first alternate component to perform the activity, in accordance with the stored hierarchy. At step 2640, supposing that the error handling module 442 receives an indication of failure by the first alternate component to perform the activity, the second alternate component is invoked to perform the activity (step 2650), in accordance with the hierarchy specified in the profiling tables. When the error handling module 442 receives an indication of success by the second alternate component (at step 2660), the error handling module 442 revises the stored hierarchy to indicate that, subsequently, the second alternate component is to be invoked before the first alternate component in any attempt to perform the activity in question. The error handling module stores the revised hierarchy in the profiling tables, at step 2670.

In this example, the profiling tables indicate that if an undeliverable message is received in response to an email transmission, the event notification module 438 is to be directed to attempt to re-send the email message after waiting a predetermined time period, such as sixty seconds. If this action fails, the profiling tables indicate that the event notification module 438 is to transmit the message by Simple Mail Transfer Protocol (SMTP) to the recipient's email address.

Accordingly, the error handling module 442 (in accordance with step 2630) invokes the event notification module 438, to re-send the email message by a different method. Supposing that the error handling module 442 is informed that event notification module 438 has failed to re-send the email message (step 2640), the error handling module 442 next directs the event notification module 442 to transmit the message by SMTP to the recipient's email address, in accordance with the associated profiling table(s) (step 2650). Supposing now that the event notification module 442 was successful, the error handling module 442 then receives a message indicating that the event notification module 442 succeeded in sending the message by SMTP (step 2660).

At step 2670, the error handling module 442 updates the profiling tables to indicate that subsequently, the event notification module 442 is to be directed to send the message by SMTP prior to attempting to re-sending the email message.

C. Job Profiler

The job profiler 150 enables an operator to generate an operator request defining a desired job. The job profiler 150 may comprise a software application residing on a computer, for example. When an operator logs onto the job profiler 150 to generate a request, a job profiling procedure is invoked. In one embodiment, the operator may specify one or more activities associated with a request, and identify the software components required for each activity by dragging, in a well-known manner, graphical icons representing each component onto a defined workspace, for example.

Figure 8A:
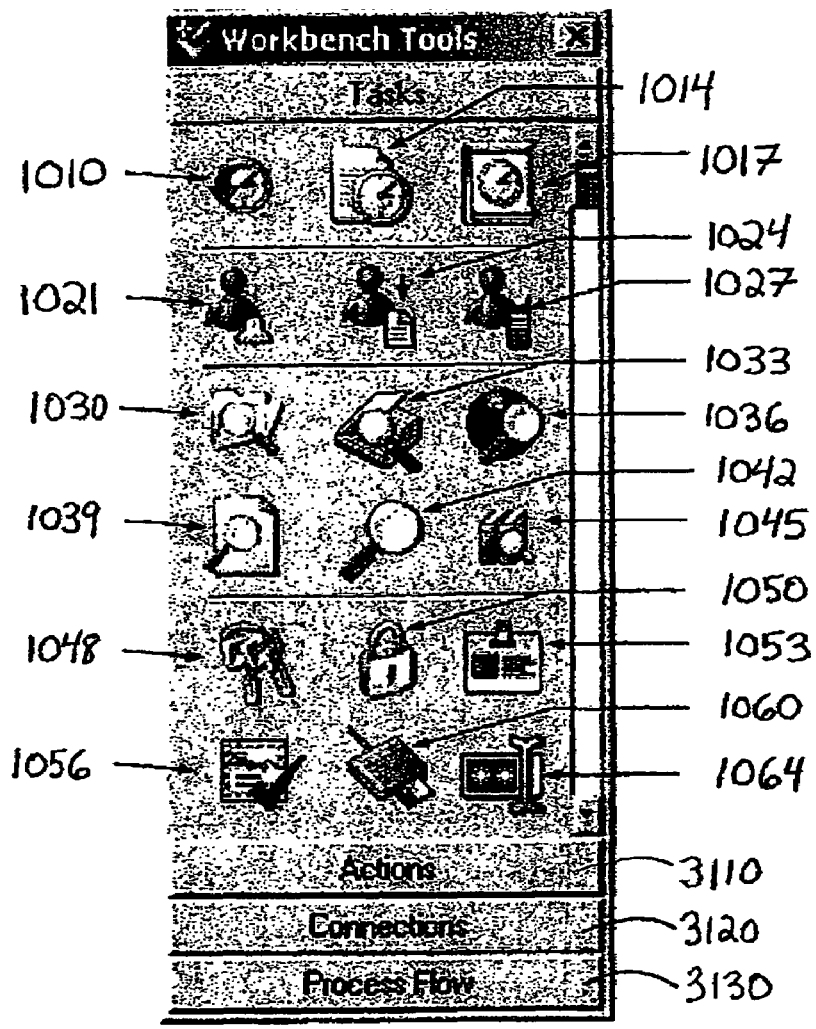
FIGS. 8A-8D show examples of graphical user interfaces ("GUIs") that may be displayed by the job profiler at various stages of the job creation process, in accordance with an embodiment of the invention.

FIGS. 8A-8D show examples of graphical user interfaces (GUIs) that may be displayed by the job profiler 150 at various stages of the job creation process. FIG. 8A shows a Tasks GUI 680 displaying graphical icons associated with various activities that may be selected by an operator to define a job. Also shown are buttons 3110, 3120, and 3130 for selecting GUIs to display icons corresponding to Actions, Connections and Process Flow, respectively, which are described below. "Reschedule" icon 1010 represents a set of instructions causing some or all of the steps in a job to be repeated, for example, if a failure occurs. "Parameter based schedule" icon 1014 represents a set of instructions for generating a job schedule based on parameters (instead of a chronologically-based schedule). Parameter-based scheduling is well-known. "Calendar based schedule" icon 1017 represents a set of instructions for establishing a chronologically-based schedule for various activities. "System notification" icon 1021 represents a set of instructions for transmitting a message to a specified pager number. "Notify Users by E-mail" icon 1024 represents a set of instructions for transmitting an email message to a specified recipient. "Phone notification" icon 1027 represents a set of instructions for placing a telephone call to a specified destination telephone number. "Search for file" icon 1030 represents a set of instructions for searching a file system for a specified file or files. "Search directory" icon 1033 represents a set of instructions for searching a directory for a specified file. "Search via web service" icon 1036 represents a set of instructions for conducting a search via the Internet, via a web browser for example. "Search inside a file" icon 1039 represents a set of instructions for performing a search within a selected file based on one or more parameters, such as one or more specified data strings. "Search via parameters" icon 1042 represents a set of instructions for searching for a file, or for data, based on one or more parameters. "Search database" icon 1045 represents a set of instructions for searching a specified database for a desired data set. "Decrypt" icon 1048 represents a set of instructions for decrypting a specified file. "Encrypt" icon 1050 represents a set of instructions for encrypting a specified file. "Authenticate" icon 1053 represents a set of instructions for authenticating a file. "Exchange" keys icon 1056 represents a set of instructions for exchanging public encryption keys. "Authenticate via smart card" icon 1060 represents a set of instructions for connecting to a system via a smartcard. "Authenticate via user login" icon 1064 represents a set of instructions for logging into a system, by entry of a username and password via a computer terminal, for example.

Figure 8B:
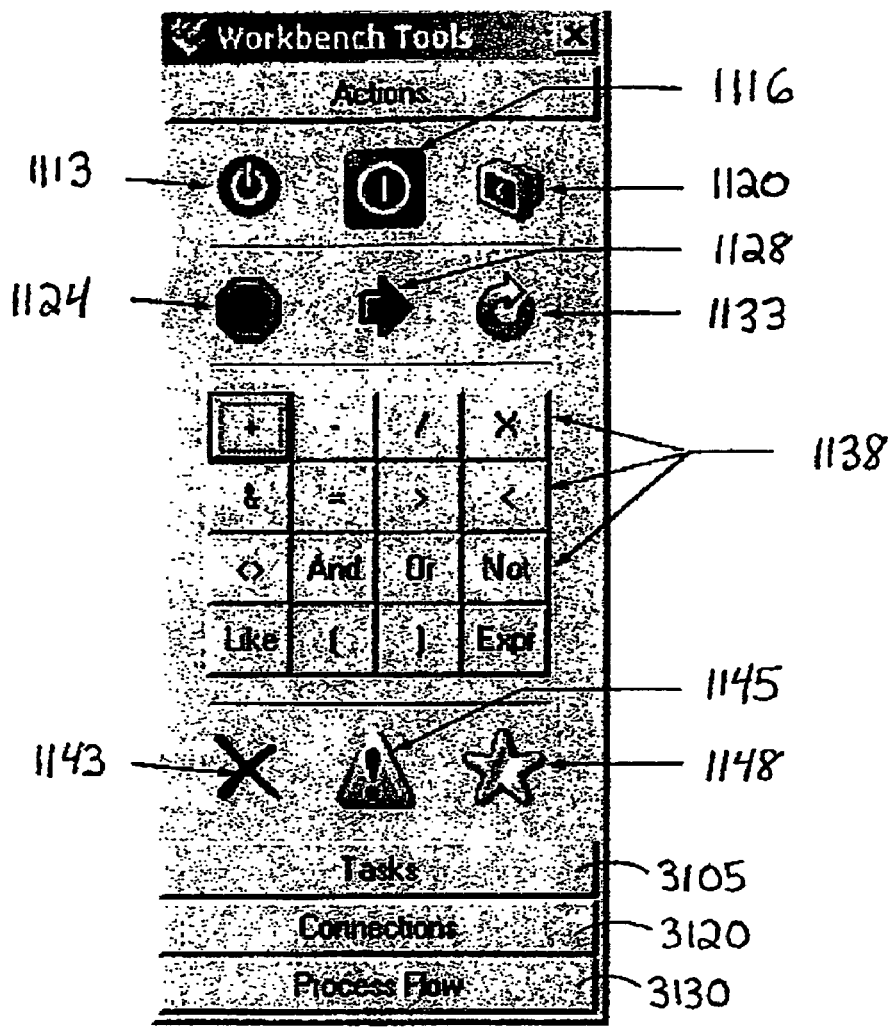

FIG. 8B shows a GUI 682 displaying icons representing various actions that may be selected by an operator to define a job, which are displayed upon selection of the Actions button 3110 shown in FIG. 8A. Also shown in GUI 682 is a button 3105 for selecting Tasks, along with buttons 3120 and 3130 for selecting Connections and Process Flow, respectively. "End" icon 1113 represents a set of instructions for defining an activity's end point. "Stop" icon 1116 represents a set of instructions for suspending execution of an activity. "Sleep" icon 1120 represents a set of instructions for placing an activity in a suspended "sleep" mode. "Fail" icon 1124 represents a set of instructions to be performed in case a failure occurs. "Success" icon 1128 represents a set of instructions to be performed in case a selected process step succeeds. "Passthrough" icon 1133 represents a set of instructions for directing an activity to continue regardless of success or failure. "Math and logic" operators 1138 represents a set of instructions for establishing logical relationships between activities. "Delete" icon 1143 represents a set of instructions for deleting an icon from the defined process flow. "Test" icon 1145 represents a set of instructions for testing one or more specified conditions. "New" icon 1148 represents a set of instructions for defining a new activity for which the job profiler 150 currently does not offer a corresponding icon. When a new activity is defined, an operator may be provided the option of creating a corresponding icon.

Figure 8C:
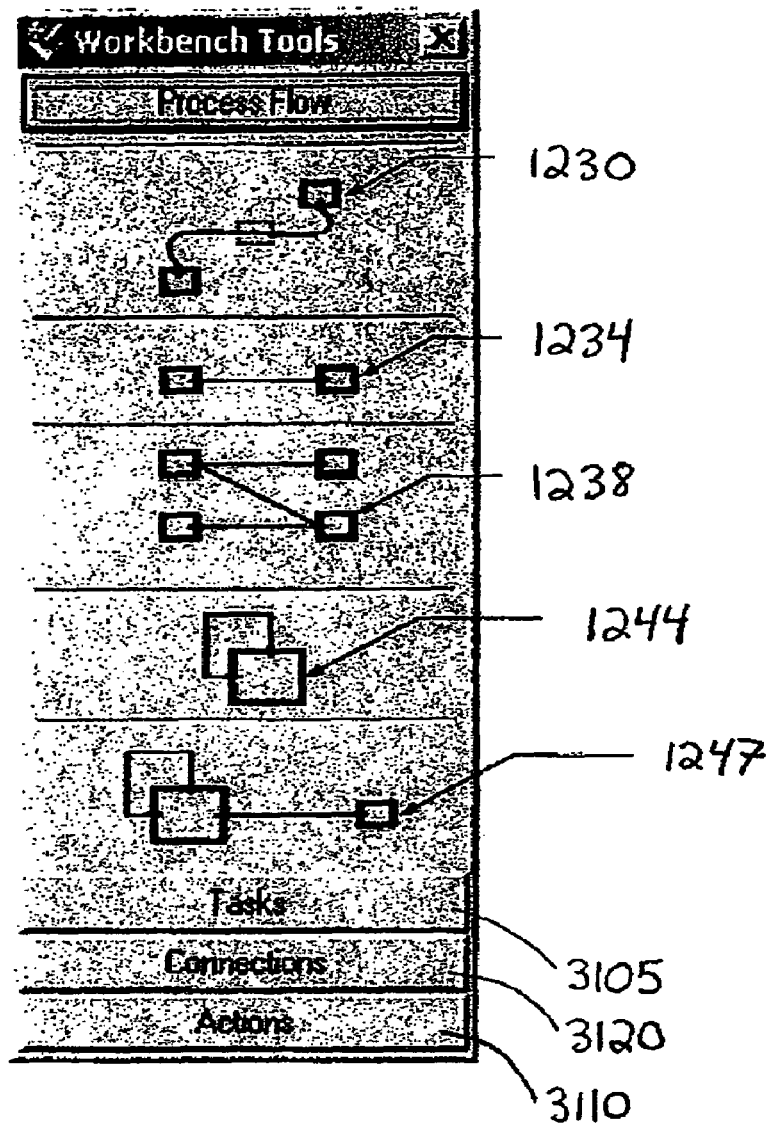

FIG. 8C shows a GUI 685 displaying icons representing various types of process flow that may be selected by an operator to define a job. Also shown in GUI 685 are buttons 3105, 3120, and 3110 for selecting Tasks, Connections and Actions, respectively. "Through and between" icon 1230 represents a set of instructions for moving from a first activity, "through" a second activity—without performing the second activity—to a third activity, which is performed. "Between" icon 1234 represents a set of instructions for establishing a sequential process flow between two tasks. "Between & offshoot" icon 1238 represents a set of instructions for defining a workflow as follows: progress from a first activity to a second activity, and potentially branch from the first activity to a third activity and then to a fourth activity. The "between and offshoot" process flow is useful for creating redundancies to ensure completion of a job. "Internal" icon 1244 represents a set of instructions for performing a specified activity, and then stopping the process flow. "Internal & between" icon 1247 represents a set of instructions for performing a first activity and then moving to a second activity.

Figure 8D:
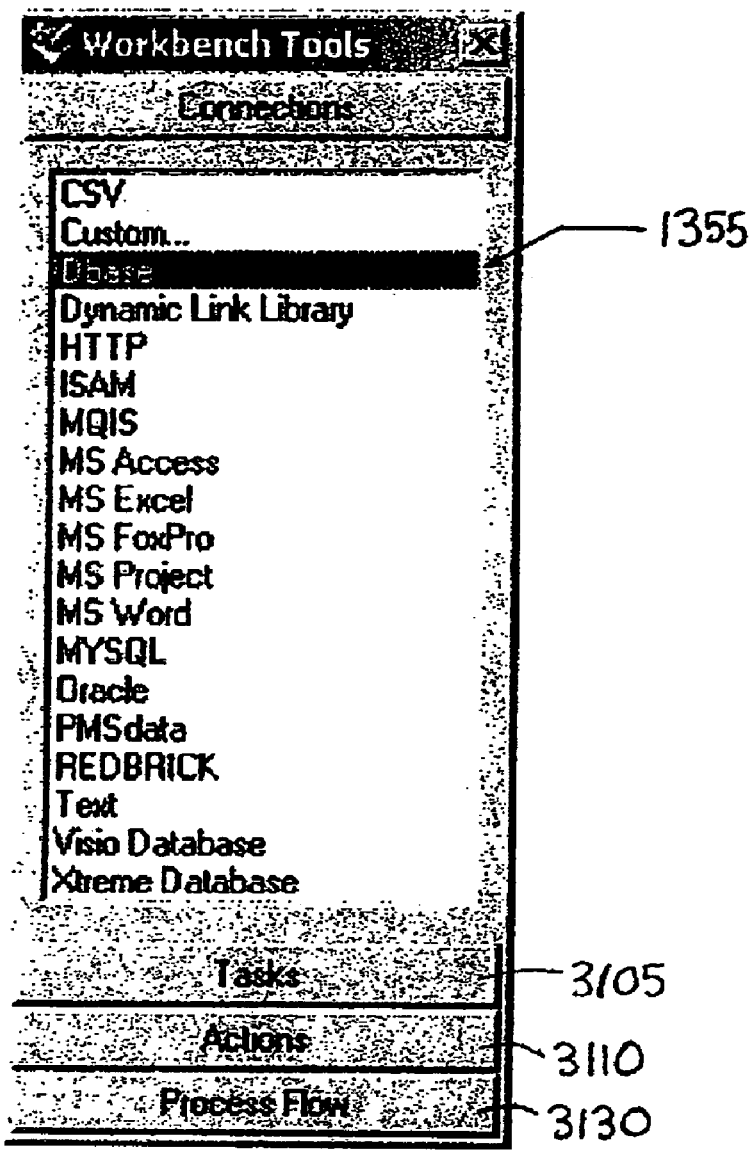

FIG. 8D shows a GUI 687 displaying selectors that represent various types of data sources to which data connections may be established, for example to retrieve data from a database. For example, "Dbase" selector 1355 is selected to specify that a connection to a Dbase file is to be established. As indicated in GUI 687, other data sources may include an MS Excel database file, an MS Word file, a Visio Database file, etc.

The job profiler 150 also participates in generating a job profile based on an operator request. During the job profiling procedure, the job profiler 150 may update one or more profiling tables in which various parameters pertaining to the job are stored. The job profiler 150 may also update a job scheduling table. One or more profiling tables may be stored in storage 140, for example. The job profiler 150 may additionally update a file in which data pertaining to the progress of the job is stored.

D. Logging Services Module

The logging services module 130 gathers information from various sources pertaining to the status of one or more jobs, and updates the corresponding profiling table(s). For example, the logging services module 130 may receive information from the job manager 400 that a particular job has been completed successfully. In response, the logging services module 130 may access the appropriate profiling table and record the fact that the specified job has been completed successfully.

Generating and Executing a Job

Figure 9:
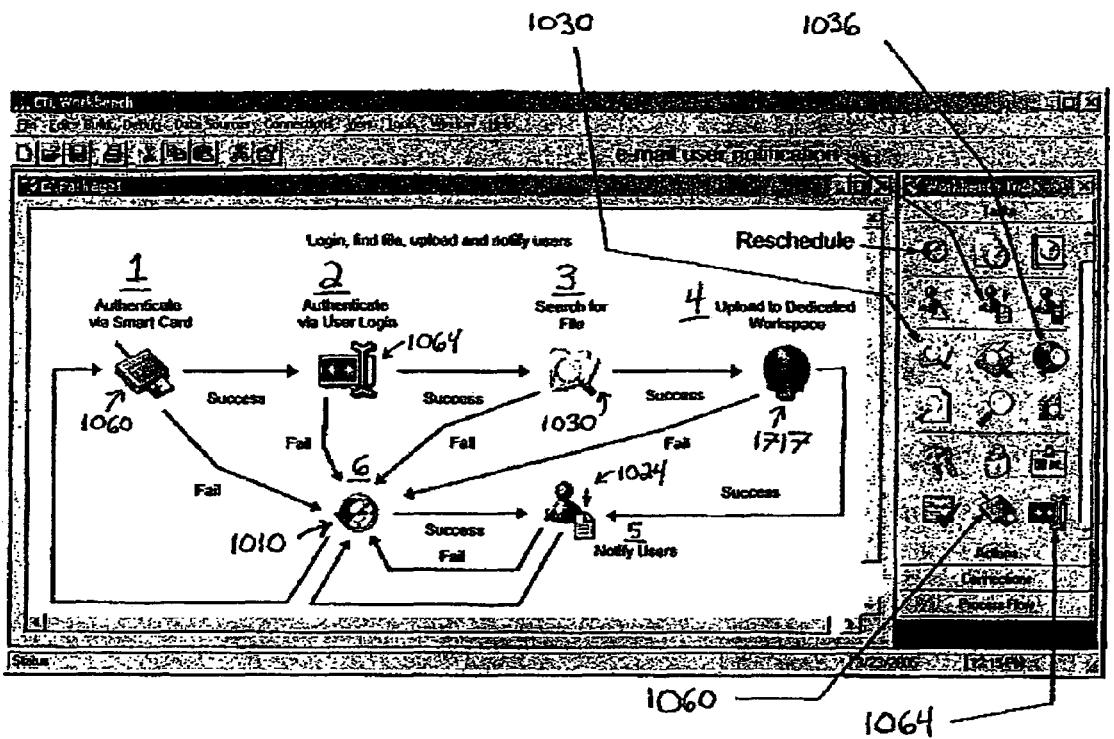
FIG. 9 shows a GUI displaying a job workflow, in accordance with the embodiment of FIGS. 8A-8D.

As described above with reference to FIG. 3, the client management system 10 may generate and perform a job based on an operator request. As described above, an operator may log onto the job profiler 150 and generate a job request by selecting one or more graphical icons displayed on one or more GUIs. FIG. 9 shows a GUI 1460 displaying a job workflow that may be created by an operator employing the capabilities of the job profiler 150, in accordance with the embodiment of FIGS. 8A-8D. In this example, the operator, who is an employee of a respective client, wishes to define a job including the following activities: (i) establish a connection to a specified network or computer system using a valid smart card; (ii) log into the system using a username and password; (iii) search for a file in a specified file system based on selected parameters; (iv) when the file is found, upload the file to the client's workspace; and (v) notify the client that the job is complete.

Accordingly, the operator logs onto the job profiler 150 and defines the job by selecting tasks, connections, process flow, and actions such as those shown in FIGS. 8A-D. In this example, the operator defines task 1 by selecting the "Authenticate via Smart Card" icon 1060. The operator may provide data pertaining to a particular smart card. The operator (by selecting an appropriate icon) now defines the connection such that if task 1 succeeds, the job proceeds to task 2. The operator defines task 2 by selecting the "Authenticate via User Login" icon 1064. The operator provides parameters required to login, such as a username and password. The operator also defines the process flow in the event task 1 fails—specifically, in this case, the job proceeds to task 6, represented by the "Reschedule" icon 1010, in which case the job is scheduled to be repeated.

The operator similarly defines tasks 3-6 and the connection between them as shown in GUI 1460. Accordingly, the operator selects the "Search for File" icon 1030 to define task 3, and provides parameters to be used to identify the desired file. The operator selects the "Upload to Dedicated Workspace" icon 1717 to define task 4. The operator selects the "Notify Users" icon 1027 to define task 5, and provides one or more email addresses to which notification messages are to be sent. The operator selects the "Reschedule" icon 1010 to define task 6. The operator may additionally provide information concerning a desired schedule for the job in a separate GUI (not shown). The information entered by the operator is used by the job profiler 150 to update one or more job profiling tables, creating a job profile based on the operator request. Subsequently, the job scheduler engine 405 monitors the job profiling tables and clock data and causes selected activities to be performed in accordance with the job profile. For example, at a time defined in a job scheduling table, the job scheduler engine 405 initiates execution of the job. The job scheduler engine 405 directs the object sequencer engine 410 to assemble the components corresponding to the activities defined in the job profile. The object sequencer engine 410 examines one or more job profiling tables to determine the requirements, activities, and parameters pertaining to the job. The object sequencer engine 410 generates an assembly, or program, to perform the job using one or more components corresponding to each activity in accordance with the job profile. In this example, the object sequencer engine 410 selects, in accordance with the job profiling tables, the security & encryption engine 423 to perform tasks 1 and 2 shown in GUI 1460. The object sequencer engine 410 selects the search engine 426 to perform task 3. The object sequencer engine 410 selects the file movement engine 430 to perform task 4 (Search for File), and the event notification engine 438 to perform task 5 (Notify Users by Email). The object sequencer engine 410 selects the job scheduler engine 405 to perform task 1010 (Reschedule). After the required components are placed in the job's assembly, the object sequencer engine 410 notifies the job scheduler engine 405.

The job scheduler engine 405 now initiates execution of the job. Referring to task 1, the security & encryption module 423 is invoked and the information pertaining to the operator's smart card is used to access the specified network or computer system. Similarly, the username and password stored in the profiling tables are used to login to the desired system (task 2). If task 2 succeeds, the job proceeds to task 3, and the security & encryption module 423 is invoked and performs a search to find a specified file within the specified file system. If task 3 succeeds, the connection proceeds to task 4, and the file movement engine 430 is invoked. The file is uploaded to the client's dedicated workspace. Referring to task 5, the event notification module 438 is invoked and transmits an email notification message to the email address specified by the operator. After task 5 has been performed successfully, the connection proceeds to reschedule task 6, and the job scheduler engine 405 reschedules the job to be repeated.

In another aspect of the invention, the client management system 10 accesses a system (such as a computer network, for example) maintained by a client in accordance with a job profile generated based on an operator request associated with the client. The client management system 10 retrieves one or more access parameters from the job profile, which are used to access data stored within the client's system. The client management system 10 processes the data in accordance with the job profile and stores the output data at a destination address specified in the job profile. By way of example, suppose that the XYZ Company ("XYZ") discussed above is a large corporation with operations around the world, and provides a daily financial report to its customers around the world. The financial report may be generated as follows. Raw sales data collected and stored in the database server 170, which is located on XYZ's premises, is retrieved. A procedure 175 stored in a memory on the database server 170 is then invoked to process the raw data and generate the report. The stored procedure 175 generates the report in a first format, such as a Lotus Notes database file. However, because some of XYZ's U.S. clients use Microsoft Access software, another version of the report must be generated in Microsoft Access database format. Additionally, because XYZ has worldwide operations, the Lotus Notes version of the report needs to be translated into selected languages, such as French, German and Japanese.

Figure 10:
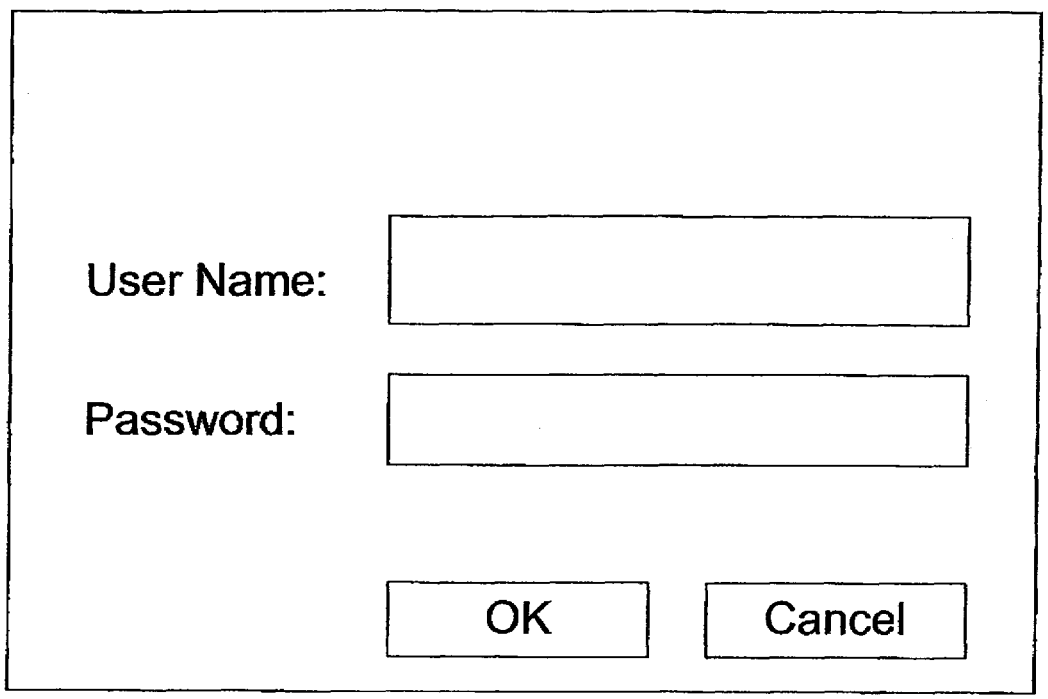
FIG. 10 shows an example of a GUI displayed on an operator terminal, in accordance with the embodiment of FIGS. 8A-8D.
Figure 11:
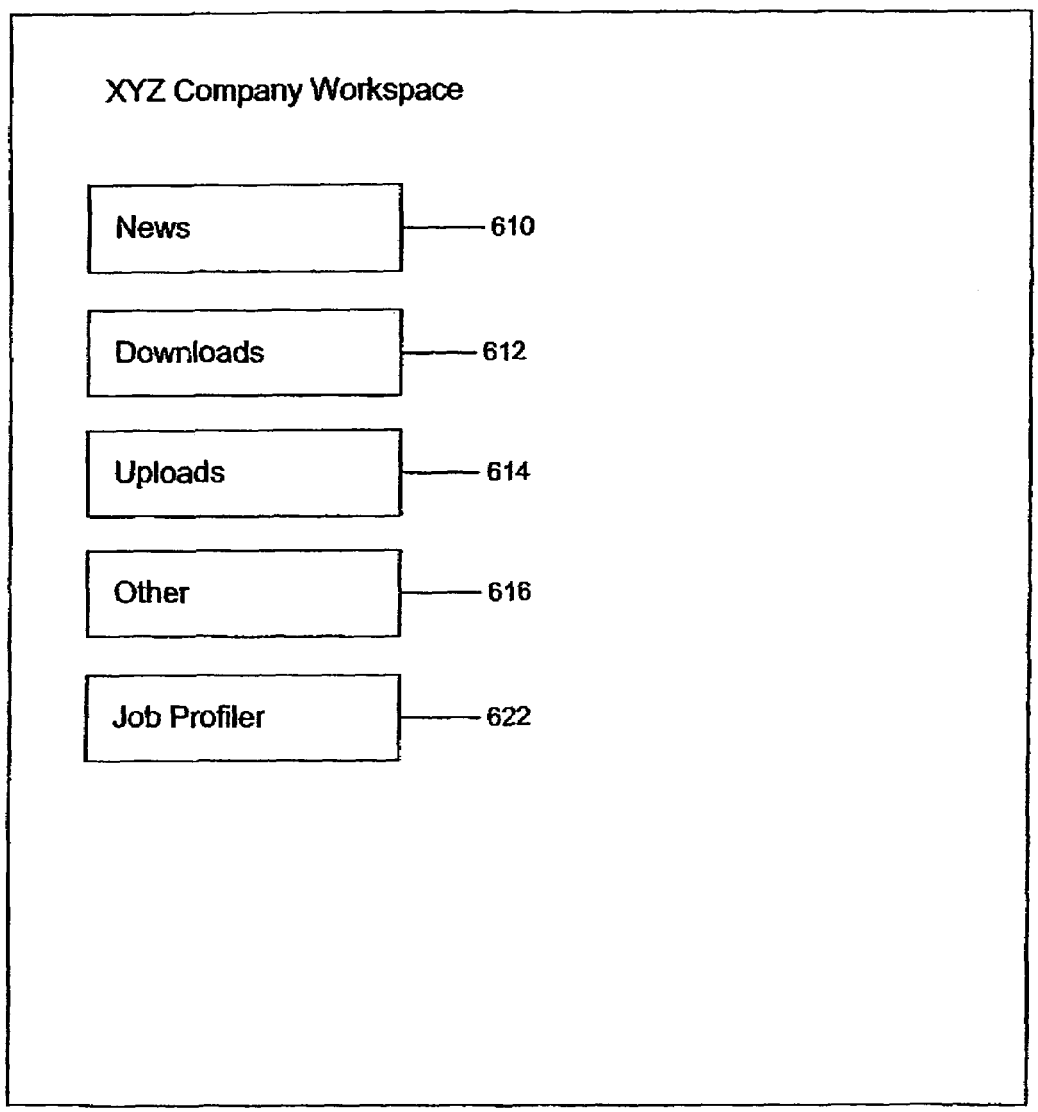
FIG. 11 shows another example of a GUI displayed on an operator terminal, in accordance with an embodiment of FIGS. 8A-8D.

Because of the substantial time and resources required to generate multiple versions of the report as described above, XYZ wishes to take advantage of the capabilities of the client management system 10 to generate the various versions of the report on a daily basis. Accordingly, referring again to FIG. 2, at step 210 an operator, who may be in this example an employee of the XYZ Company, logs onto the client website and submits a request for such a report to the client management system 10. Suppose that in this example, the operator utilizes the operator terminal 180 to access the XYZ dedicated workspace 138. The operator uses an Internet browser operating on terminal 180, entering a specified URL into the address field thereof. A communication link is established between the terminal 180 and the exchange gateway 300, and the exchange gateway 300 causes a GUI, such as that shown in FIG. 10, to be displayed on the operator terminal 180. GUI 500 may be a standard HTML interface, for example. As shown in FIG. 10, the operator is prompted to enter a username and password. Supposing in the illustrative example, that the operator enters the appropriate username and password ("XYZ" and "12345678" in this instance), the exchange gateway 300 causes another GUI, such as that shown in FIG. 11, to be displayed on terminal 180. GUI 600 comprises a "News" button 610, a "Downloads" button 612, an "Uploads" button 614, and an "Other" button 616, corresponding to directories 131-134 (shown in FIG. 3), respectively. GUI 600 additionally includes a "Job Profiler" button 622, enabling the operator to invoke the job profiler 150.

The operator selects the job profiler button 622, causing the job profiler 150 to be invoked. In this example, the operator utilizes the job profiler 150 to provide information pertaining to various activities associated with the job request. In particular, the operator specifies that a financial report is to be generated in Lotus Notes database format based on certain financial data that is gathered and stored in the remote database server 170, located on the XYZ Company LAN. The operator provides connection information pertaining to the database server 170, including, for example, any usernames and relevant passwords, and an address indicating the storage location of the raw financial data stored on the database server 170. The operator additionally provides information identifying and describing the location of the procedure 175 which, when invoked, processes the stored financial data and generates the report in the form of a Lotus Notes database file. The operator may provide information concerning the stored procedure, such as the appropriate method for invoking the procedure, any parameters required to invoke it, where any output data is stored, etc. The operator requests also that a second version of the report be generated in the form of a Microsoft Access file and that the Lotus Notes version be translated into French, German, and Japanese. The operator further requests that each version of the report, once generated, is to be encrypted, compressed, and stored in the "Downloads" folder in XYZ's dedicated workspace.

The job profiler 150 may additionally allow the operator to define a time of day when each activity is to be performed. In this example, the operator specifies that the report is to be generated at 6:00 PM each business day. The operator may additionally specify the sequence of events for the job workflow, and the time(s) at which various activities associated with the job are to be performed, if desired. If there are any errors in the production of the report, an email is to be sent to a specified email address associated with XYZ Company. An additional copy of the email is to be sent to a specified XYZ employee.

Referring now to step 220 of FIG. 2, the job profiler 150 generates a job profile based on information in the operator request. A job profile comprises a variety of information defining the parameters of a job; this information may be stored in one or more profiling tables in a memory, such as memory 461 in job manager 400. The job profiler 150 may also update a job history table. The job history table is used to record when various activities are performed, whether or not they are successfully completed, etc. The job profiler 150 may additionally update a job scheduling table (also stored in memory 461, for example) to indicate that the job is to be performed each business day at 6:00 PM.

Figure 12:
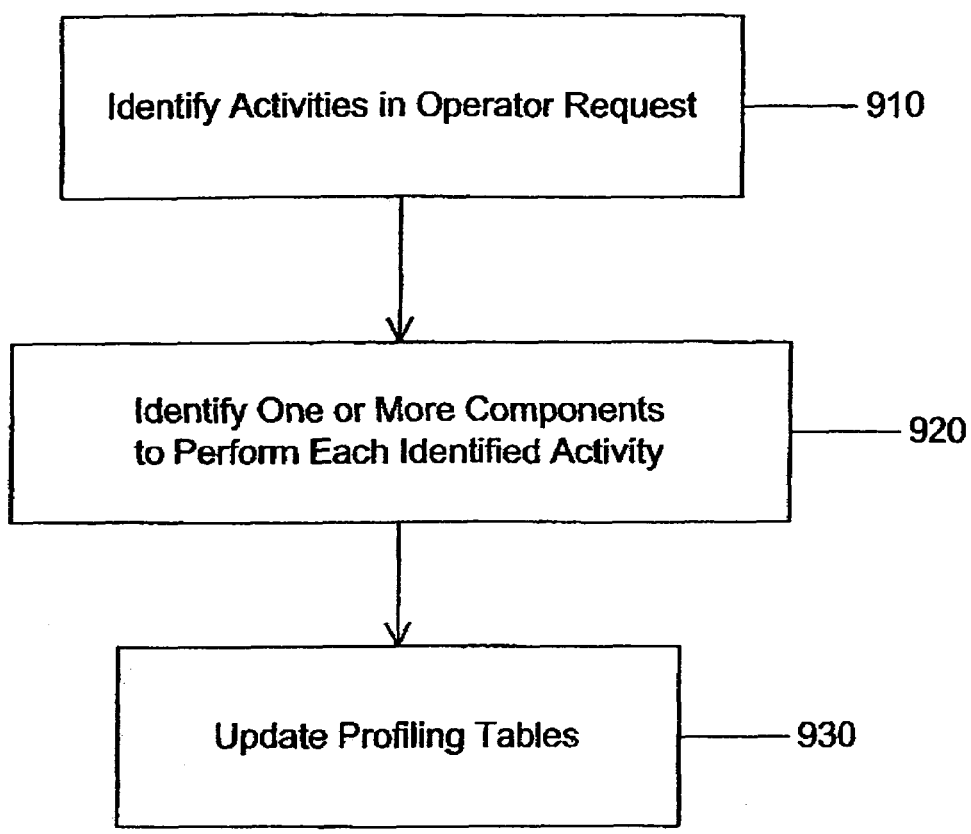
FIG. 12 is an example of a method for generating a job profile, in accordance with the embodiment of FIGS. 8A-8D.

FIG. 12 is an example of a method for generating a job profile, in accordance with the embodiment of FIGS. 8A-8D. At step 910, the job profiler 150 examines the operator request and identifies one or more activities that must be performed in accordance with the operator request. In the instant example, the job profiler 150 identifies the following activities: connect to database server 170; execute procedure 175 (see FIG. 3); retrieve the Lotus Notes database file generated by procedure 175; convert the file into Microsoft Access format; convert the file into French, German, and Japanese; encrypt each version of the file; compress each of the encrypted files; store the compressed and encrypted files in XYZ's dedicated workspace 138; store the various versions of the report in the "Downloads" directory 132 of the client's dedicated workspace 138; send appropriate email messages if an error occurs during the performance of any of these activities, and send an email notification message to the specified email address at XYZ.

At step 920, the job profiler 150 identifies, for each activity in the job, one or more components to be invoked to perform the activity. In the illustrative example, the job profiler 150 identifies, primarily, components within the job manager 400. Accordingly, the job profiler 150 initiates a connection to the job manager 400, and prompts the operator to identify components of job manager 400 that are needed to perform various activities associated with the operator request.

As described above, the operator may identify components required for the job by "dragging" graphical icons representing various tasks, actions, connections, etc., onto a defined workspace and specifying the desired properties of each object. In some cases, an activity is associated with a respective component. In this example, the operator selects the following components: (1) the DB object invocation engine 435, to connect to database server 170, execute procedure 175, and retrieve the Lotus Notes database file generated by procedure 175; (2) the format converter engine 415, to convert the Lotus Notes file into Microsoft Access format, and to additionally to convert the Lotus Notes file into French, German, and Japanese; (3) the encryption module 423, to encrypt each version of the file; (4) the compression module 425, to compress each of the encrypted files; (5) the file movement engine 430, to store the compressed and encrypted files in the "Downloads" directory 132 of XYZ's dedicated workspace 138; and (6) the event notification module 438, to send appropriate email messages if an error occurs during the performance of any of these activities, and to send an email notification message to the specified email address at XYZ.

At step 930, one or more profiling tables are updated to incorporate information pertaining to the operator request, including information identifying the activities included in the job, and the components selected to perform each activity. The job profiler 150 updates selected profiling tables to reflect information received from the operator.

The job scheduler engine 405 subsequently monitors the job profiling tables and clock data and causes selected activities to be performed in accordance with the job profile. For example, at 6:00 PM on a particular business day, the job scheduler engine 405 may examines the job profile and determine that the job described above must be performed. The job scheduler engine 405 invokes the object sequencer engine 410 and directs the object sequencer engine 410 to assemble the components necessary to perform the job.

Figure 13:
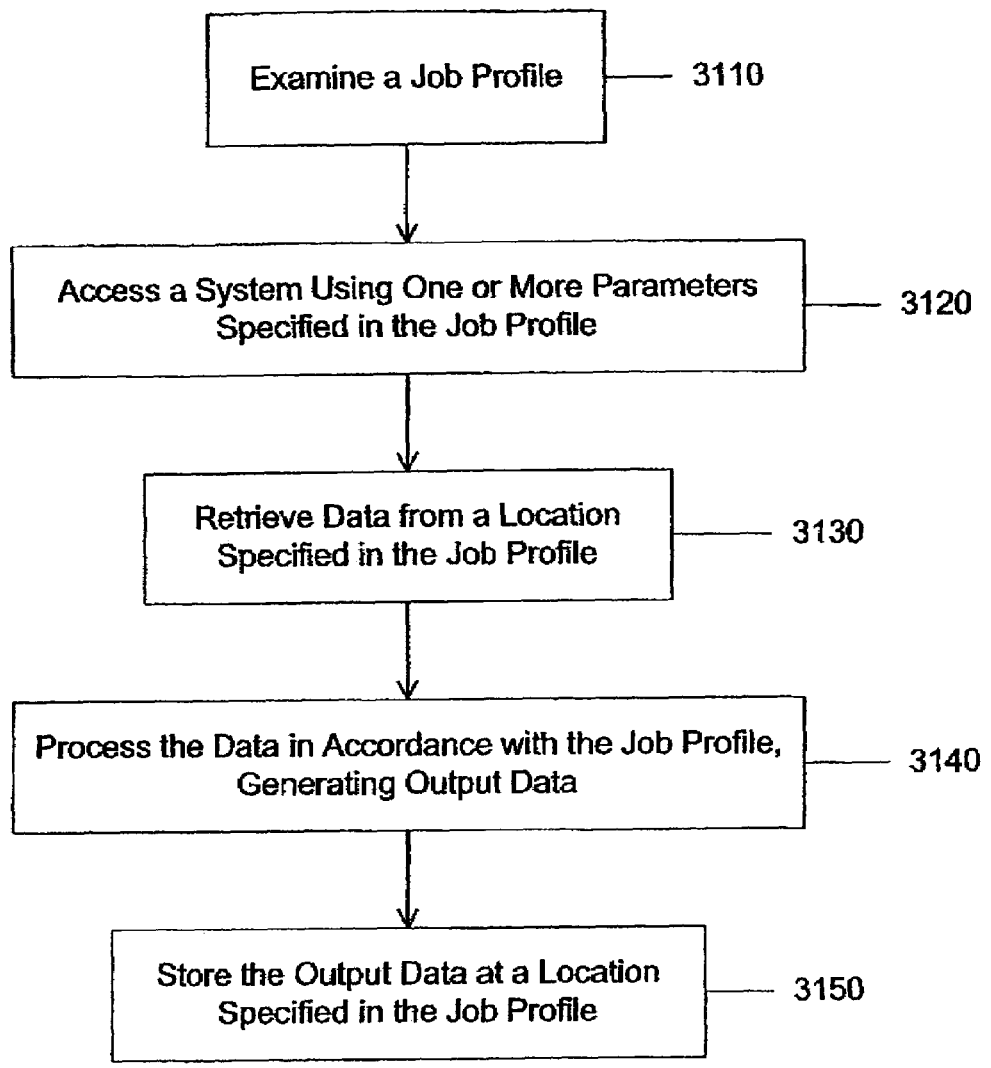
FIG. 13 is an example of a method for retrieving and processing data in accordance with a job profile, in accordance with the embodiment of FIGS. 8A-8D.

Referring to FIG. 13, a job profile is examined, at step 3110. The object sequencer engine 410 may examine one or more job profiling tables to determine the requirements and parameters pertaining to the job, for example. The object sequencer engine 410 generates an assembly, or program, to perform the job using one or more pre-existing components. The pre-existing components may comprise pre-compiled code, for example. In this example, the object sequencer engine 410 determines that the first component necessary for the job is the DB object invocation engine 435. Accordingly, the DB object invocation engine 435 is placed in the job's assembly. The object sequencer engine 410 similarly determines that the format converter engine 415, the encryption module 423, the compression module 425, the file movement engine 430, and the event notification module 438 are required to perform the job; therefore, these components are placed in the job's assembly. The job assembly may be stored in storage 140, for example. After the required components are placed in the job's assembly, the object sequencer engine 410 notifies the job scheduler engine 405.

The job scheduler engine 405 now initiates execution of the job. The DB object invocation engine 435 is invoked and examines the appropriate job profiling tables to determine the username, password, and connection information necessary to access database server 170. The DB object invocation engine 435 also obtains the name of the stored procedure 175, the method for invoking the procedure, the parameters required by the stored procedure 175, information indicating where the output of the procedure is stored, etc. At step 3120, a system is accessed using one or more parameters specified in the job profile. Accordingly, the DB object invocation engine 435 accesses the database server 170 using the parameters specified in the job profiling tables. Thus, the DB object invocation engine 435 uses the username, password, and other stored parameters and information to access the database server 170 and execute the stored procedure 175. When executed, the stored procedure 175 generates a report in the form of a Lotus Notes database file and stores the Lotus Notes report in a specified storage location. At step 3130, data is retrieved from the location specified in the job profile. Thus, in this example, the DB object invocation engine 435 retrieves the Lotus Notes version of the report from the location specified in the profiling tables, and stores the Lotus Notes report in a memory, such as memory 461. If the activities assigned to the DB object invocation engine 435 are completed successfully, the DB object invocation engine 435 invokes the logging services module 130 to update the appropriate profiling tables to indicate that its assigned activity was successfully completed, and when. Finally, the DB object invocation engine 435 notifies the job scheduler engine 405 that its activities are completed.

At step 3140, data is processed in accordance with the job profile, generating output data. In the present example, the job scheduler engine 405 causes the Lotus Notes version of the report to be converted into several different formats. The job scheduler engine 405 examines the profiling tables stored in storage 140 and determines that the format converter engine 415 is scheduled to be invoked subsequent to the DB object invocation engine 435. Accordingly, the job scheduler engine 405 invokes the format converter engine 415, which, in response, examines one or more associated profiling tables, and determines that its assigned activities include converting the Lotus Notes version of the report into a Microsoft Access database format, and converting the Lotus Notes version into French, German, and Japanese. Accordingly, the format converter engine 415 retrieves the stored Lotus Notes version of the report from memory 461 and converts it to the Microsoft Access format. The format converter engine 415 then saves the Microsoft Access version in memory 461, for example, within job manager 400. The format converter engine 415 also generates French, German, Japanese versions of the report. Finally, the format converter engine 415 invokes the logging services module 130 to update the appropriate profiling tables to indicate that its assigned activity was successfully completed, and when.

The job scheduler engine 405 now examines the profiling tables and determines that the encryption module 423 is scheduled to be invoked subsequent to the format converter engine 415. Accordingly, the job scheduler engine 405 invokes the encryption module 423, which, in response, examines the appropriate profiling tables and determines that its assigned activity is to encrypt the various versions of the report. The encryption module 423 retrieves the various versions of the report from memory 461, and encrypts them. The encrypted versions are stored in memory 461. Finally, the encryption module 423 invokes the logging services module 130 to update the profiling tables to indicate that its assigned activity was successfully completed, and when.

The job scheduler engine 405 examines the profiling tables and determines that the compression module 425 is scheduled to be invoked subsequent to the encryption module 423. Accordingly, the job scheduler engine 405 invokes the compression module 425, which, in response, examines the profiling tables and determines that its assigned activity is to compress the encrypted versions of the report. The compression module 425 retrieves the encrypted versions from memory 461, and compresses them The encrypted and compressed versions are stored in memory 461 Finally, the compression module 425 invokes the logging services module 130 to update the appropriate profiling tables to indicate that its assigned activity was successfully completed, and when.

At step 3150, the output of the data processing activity is stored in a location specified in the job profile. In this example, the job scheduler engine 405 examines the profiling tables and determines that the file movement engine 430 is now scheduled to be invoked to deposit the various versions of the report in a selected location. The job scheduler engine 405 invokes the file movement engine 430, which, in response, examines the profiling tables and determines that its assigned activity is to store the encrypted and compressed versions of the report in the dedicated workspace 138. The file movement engine 430 retrieves from the profiling tables the source address where the various versions of the report are currently stored. The file movement engine 430 also determines from the job profile the desired destination directory in the client's dedicated workspace 138, which is in this instance the "Downloads" directory 132. The file movement engine 430 retrieves the encrypted and compressed reports from memory 461 and moves them to the Downloads directory 132. FIG. 14 illustrates the Downloads directory 132 after five different versions of the report are saved—one Lotus Notes version, one Microsoft Access version, and versions in French, German, and Japanese. Finally, the file movement engine 430 invokes the logging services module 130 to update the appropriate profiling tables to indicate that its assigned activity was successfully completed, and when.

The job scheduler engine 405 invokes the event notification module 438 after the specified activity are completed. The event notification module 438 examines the appropriate profiling tables to determine if any events require notification services. In the illustrative example, activities that were not completed successfully result in email notification. Accordingly, the event notification module 438 generates one or more email messages for each error detected in the profiling tables. If no errors are detected, no error messages are generated. The event notification module 438 also generates and sends a notification message to the specified email address associated with XYZ. After the event notification module 438 examines the profiling tables and sends any necessary messages, the job scheduler engine 405 is informed.

The job scheduler engine 405 determines that the job is complete for the respective day, and updates the appropriate profiling tables accordingly.

In accordance with another embodiment of the invention, a request for a job may be generated automatically, and the job may be generated and executed automatically, by one or more components within the client management system 10. By way of example, suppose that a hypothetical job (requested by an operator) includes three activities: (1) retrieving a selected file from a specified source database; (2) compressing the file using a standard compression technique; and (3) storing the file on a specified disk drive. Suppose while the job is executing, the file is retrieved and compressed, but then when the file movement engine 430 attempts to store the compressed file it receives notification that the size of the compressed file exceeds the amount of storage space available on the specified disk drive. In response, the file movement engine 430 transmits a communication to the job profiler 150 requesting that a new job be created. The communication indicates the job is to include the following activities: (1) retrieve the selected file from the specified source database; (2) compress the file using a size vs. time optimization algorithm to produce a compressed file having a desired size that fit on the disk drive in question; and (3) store the file on the specified disk drive. A new (or updated) job profile is generated based on the details contained in the communication, and the new job is then executed based on the job profile, achieving the desired result.

It is to be noted that client management system 10 is disclosed herein in a form in which various functions are performed by discrete functional blocks. However, any one or more of these functions could equally well be embodied in an arrangement in which the functions of any one or more of those blocks or indeed, all of the functions thereof, are realized, for example, by one or more appropriately programmed processors. Such an arrangement may include one or more application-specific integrated circuits (ASICs), for example. Alternatively, any one or more of these functions may be implemented by software, or by a combination of software and hardware.

The foregoing merely illustrates the principles of the invention. It will thus be appreciated that those skilled in the art will be able to devise numerous other arrangements which embody the principles of the invention and are thus within its spirit and scope, which is defined by the claims below.

What is claimed is:

1. A method for performing an error handling activity, comprising:
   determining an error handling activity to be performed;
   examining a stored hierarchy comprising at least one profiler table, the stored hierarchy indicating a first alternate component for performing the activity first and a second alternate component for performing the activity if the first alternate component fails;
   invoking, by at least one processor, the first alternate component to perform the activity;
   invoking, by the at least one processor, the second alternate component to perform the activity, when a failure of the first alternate component to perform the activity is detected; and
   storing, by the at least one processor, in the at least one profiler table a revised hierarchy indicating that the second alternate component is to be invoked to perform the activity before the first alternate component is invoked to perform the activity.

2. The method of claim 1, further comprising:
   receiving, by the at least one processor, a first indication of a failure of the first alternate component to perform the activity.

3. The method of claim 2, wherein the first indication is received from the first alternate component.

4. The method of claim 1, further comprising:
   receiving, by the at least one processor, a second indication of a failure of the second alternate component to perform the activity.

5. The method of claim 4, wherein the second indication is received from the second alternate component.

6. The method of claim 1, wherein the activity is selected from a group consisting of: accessing a remote database server, retrieving data from a database, invoking a stored procedure, converting a data file from a first format to a second format, converting a data file from a first language to a second language, creating a new file, appending data to an existing file, executing operating system commands locally and remotely, loading data into a database table, archiving and compressing data, and invoking web services from the Internet.

7. The method of claim 1, wherein the first alternate component comprises a pre-compiled software component.

8. The method of claim 1, wherein the second alternate component comprises a pre-compiled software component.

9. The method of claim 1, further comprising:
   generating a revised hierarchy indicating that the second alternate component is to be invoked to perform the activity before the first alternate component is invoked to perform the activity.

10. The method of claim 1, wherein the activity is defined in one or more profiling tables.

11. An computer-implemented apparatus for performing an error handling activity defined in a profile, comprising:
    processor means for determining an error handling activity to be performed;
    processor means for examining a stored hierarchy in at least one profiler table, the stored hierarchy indicating a first alternate component for performing the activity first and a second alternate component for performing the activity if the first alternate component fails;
    processor means for invoking the first alternate component to perform the activity;

processor means for invoking the second alternate component to perform the activity, when a failure of the first alternate component to perform the activity is detected; and processor means for storing a revised hierarchy in the at least one profiler table indicating that the second alternate component is to be invoked to perform the activity before the first alternate component is invoked to perform the activity.

12. A system for performing an error handling activity defined in a profile, comprising:

a memory for storing a hierarchy in at least one profiler table, the hierarchy indicating a first alternate component for performing the error handling activity first and a second alternate component for performing the activity if the first alternate component fails; and a processor programmed to:
determine an activity to be performed;
examine the stored hierarchy;
invoke the first alternate component to perform the activity;
invoke the second alternate component to perform the activity, when a failure of the first alternate component to perform the activity is detected; and
store a revised hierarchy in the at least one profiler table, the revised hierarchy indicating that the second alternate component is to be invoked to perform the activity before the first alternate component is invoked to perform the activity.

13. The system of claim 12, wherein the processor is further programmed to:
receive a first indication of a failure of the first alternate component to perform the activity.

14. The system of claim 13, wherein the first indication is received from the first alternate component.

15. The system of claim 12, wherein the processor is further programmed to:
receive a second indication of a failure of the second alternate component to perform the activity.

16. The system of claim 15, wherein the second indication is received from the second alternate component.

17. The system of claim 12, wherein the activity is selected from a group consisting of: accessing a remote database server, retrieving data from a database, invoking a stored procedure, converting a data file from a first format to a second format, converting a data file from a first language to a second language, creating a new file, appending data to an existing file, executing operating system commands locally and remotely, loading data into a database table, archiving and compressing data, and invoking web services from the Internet.

18. The system of claim 12, wherein the first alternate component comprises a pre-compiled software component.

19. The system of claim 12, wherein the second alternate component comprises a pre-compiled software component.

20. The system of claim 12, wherein the processor is further programmed to:
generate a revised hierarchy indicating that the second alternate component is to be invoked to perform the activity before the first alternate component is invoked to perform the activity.

* * * * *